United States Patent
Kajiya et al.

(10) Patent No.: US 6,970,650 B2
(45) Date of Patent: Nov. 29, 2005

(54) ONE-CORE TWO-WAY OPTICAL TRANSMISSION SYSTEM

(75) Inventors: Satoshi Kajiya, Tokyo (JP); Kaoru Kinjo, Tokyo (JP); Takashi Mizuochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/477,535

(22) PCT Filed: Feb. 26, 2003

(86) PCT No.: PCT/JP03/02115

§ 371 (c)(1),
(2), (4) Date: Nov. 13, 2003

(87) PCT Pub. No.: WO03/079583

PCT Pub. Date: Sep. 25, 2003

(65) Prior Publication Data

US 2004/0161214 A1    Aug. 19, 2004

(30) Foreign Application Priority Data

Mar. 15, 2002  (JP) ............................... 2002-072803

(51) Int. Cl.[7] .............................................. H04J 14/02
(52) U.S. Cl. ...................... 398/92; 398/157; 385/123; 359/334; 359/341.31
(58) Field of Search ................ 359/334, 341.1–341.31; 385/100–114, 123–128; 398/81, 82, 92, 157, 398/159, 160, 147

(56) References Cited

U.S. PATENT DOCUMENTS 5,812,306 A  *  9/1998  Mizrahi .................. 359/341.2
6,239,903 B1 *  5/2001  Islam et al. ................. 359/337
6,744,556 B2 *  6/2004  Gray et al. ............. 359/341.32
2002/0051267 A1 * 5/2002  Nakamura et al. .......... 359/134
2003/0016437 A1 * 1/2003  Islam et al. ................. 359/334
2003/0081290 A1 * 5/2003  Kinjo et al. ................. 359/160
2004/0212871 A1 * 10/2004 Hoshida et al. ............. 359/333

FOREIGN PATENT DOCUMENTS

| JP | 58-084550 | 5/1983 |
| JP | 11-252050 A | 9/1999 |
| JP | 2002-9707 A | 1/2002 |
| JP | 2002-135212 A | 5/2002 |

OTHER PUBLICATIONS

Neuhauser, et al., Impact of nonlinear pump interactions on broadband distributed Raman amplification, Optical Society of America, 2000, pp. MA4-1 to MA4-3.
Terahara et al., Employing Dual-band Distributed Raman Amplification Optical Fiber Communication Conference, vol. 4, pp. 251-253 (2000).

* cited by examiner

*Primary Examiner*—Frank G. Font
*Assistant Examiner*—Derek L. Dupuis
(74) *Attorney, Agent, or Firm*—Birch, Stewart, Kolasch & Birch LLP

(57) ABSTRACT

In a one-fiber bidirectional optical transmission system in which output optical signals of optical transmitter-receivers respectively connected to the opposite ends of one optical fiber transmission line are bidirectionally transmitted in the optical fiber transmission line, which utilizes a Raman amplification effect by backward pumping, a frequency satisfying the conditions of $|f_{s1}-f_0|\neq|f_{p2}-f_0|$ and $|f_{s2}-f_0|\neq|f_{p1}-f_0|$ is selected, where $f_0$ is a zero dispersion frequency of the optical fiber transmission line, $f_{s1}$ and $f_{s2}$ are the frequencies of the first signal and the second signal, respectively, and $f_{p1}$ and $f_{p2}$ are frequencies of the first Raman pump light and the second Raman pump light, respectively.

17 Claims, 10 Drawing Sheets

ONE-CORE TWO-WAY OPTICAL TRANSMISSION SYSTEM

This application is the national phase under 35 U.S.C. §371 of PCT International Application No. PCT/JP03/02115 which has an International filing date of Feb. 26, 2003, which designated the United States of America.

TECHNICAL FIELD

The present invention relates to a one-fiber bidirectional optical transmission system utilizing a Raman amplification effect.

BACKGROUND ART

There are demands in the optical transmission system for an increase in communication capacity, a reduction in communication cost, an increase in transmission speed, and extension of relay intervals, due to a rapid increase in the number of subscribers for the Internet portable telephones and the like, and an increase in needs for speech communication, image communication and the like.

There is a one-fiber bidirectional optical transmission system for realizing these. This system can transmit output light signals from optical transmitter-receivers, respectively connected to the opposite ends of one optical fiber transmission line, bidirectionally into the optical fiber transmission line, thereby reducing the number of the optical fibers and improving the use efficiency of the optical fiber. As a result, an increase in the communication capacity, a reduction in the communication cost, and an increase in the transmission speed can be realized.

There is also an optical transmission system using a Raman amplifier. This system uses a Raman amplification effect, which is obtained when a pump light is incident on the optical fiber serving as an amplification medium. Extension of relay intervals and a reduction in the communication cost can be realized by using the amplification effect and increasing the length of the optical fiber transmission line.

Raman amplification is a phenomenon in which the optical fiber itself where a signal light is transmitted is used as an amplification medium, a pump light incident on the optical fiber causes vibrations in a crystal lattice of a material forming the optical fiber, and due to the interaction between the pump light and optical phonons generated by the vibrations in the crystal lattice, scattered light referred to as Stokes light is induced to a short frequency shifted by a peculiar quantity from the pump frequency, and amplified. The amplification gain generated by the Raman amplification depends on the material of the optical fiber, and generally has a Raman gain band as shown in FIG. 9. FIG. 9 is a graph of a gain band of a typical Raman amplifier, wherein X axis denotes a wavelength difference (nanometer), and Y axis denotes a Raman gain coefficient. A wavelength having the maximum gain is on the long wavelength side apart from a pump wavelength by 100 nanometers to 110 nanometers, and has a gain band in a wavelength range of about 60 nanometers, with the bottom widely extending from the central wavelength having the maximum gain towards the short wavelength side.

As for the incident direction of the pump light in Raman amplification, there are two types, that is, a method in which the pump light enters in the same direction as the traveling direction of a signal light (forward pumping), and a method in which the pump light enters in a direction opposite to the traveling direction of the signal light (backward pumping).

In general, however, it is known that the backward pumping with less crosstalk generated in a signal light by the pump light is advantageous. Therefore, an optical transmission system obtained by combining the one-fiber bidirectional optical transmission system with the backward pumping Raman amplifier is expected as an optical transmission system utilizing its merits.

In the one-fiber bidirectional optical transmission system, however, multiplexed signal lights are transmitted bidirectionally, and a plurality of pump lights is used, and hence there is a problem in that the system is likely to be affected by four wave mixing. The four wave mixing is a phenomenon in which optical signals having different wavelengths, which propagate in the optical fiber transmission line, affect each other to generate light having a new wavelength.

FIG. 10(a) is one example of reception spectra after being transmitted for 200 kilometers, when wavelength-multiplexed signal lights and a Raman pump light are input to the optical fiber transmission line. FIG. 10(b) is an enlarged diagram thereof in the vicinity of the wavelength-multiplexed signal lights in FIG. 10(a). Specific parameters are such that the wavelengths of backward pumped Raman pump light are 1430 nanometers and 1460 nanometers, the wavelengths of the wavelength-multiplexed signal lights are 32 wavebands of from 1576.2 nanometers to 1602.3 nanometers (with an interval of 100 gigahertz), and the optical fiber transmission line is a non-zero dispersion shifted fiber with a zero dispersion wavelength at 1505.2 nanometer waveband.

As shown in FIG. 10(b), the signal level is raised at a wavelength in the vicinity of 1589 nanometers, thereby causing deterioration in the frequency-multiplexed signal. This is because four wave mixing occurs due to the Raman pump light and the frequency-multiplexed signal lights propagating in the same direction, thereby causing phase matching with a zero dispersion wavelength in the optical fiber transmission line. In an example shown in this figure, a frequency $f_p$ of the Raman pump light is 209.65 terahertz (1430 nanometers), one signal frequency $f_s$ of a frequency-multiplexed signal light is 188.70 terahertz (1588.7 nanometers), and a zero dispersion frequency $f_0$ in the optical fiber transmission line is 199.17 terahertz (1505.2 nanometers), and at this time, the phase matching condition of a following equation $$|f_p - f_0| = |f_s - f_0| \tag{1}$$

is realized, and deterioration in the frequency-multiplexed signal lights occurs due to four wave mixing.

This is a phenomenon in which deterioration in optical signals occurs, when a light generated by the four wave mixing and an input signal light satisfy a certain phase matching condition, and it becomes an important subject how to overcome the deterioration in the optical signal.

It is therefore an object of the present invention to provide a one-fiber bidirectional optical transmission system that can obtain desired reception characteristics, without being affected by four wave mixing bidirectionally.

DISCLOSURE OF THE INVENTION

A one-fiber bidirectional optical transmission system according to one aspect of the present invention includes an optical fiber transmission line that transmits a first signal light and a second signal light, wherein the first signal light is transmitted in a first direction from one input-output terminal to other input-output terminal, and the second signal light is transmitted in a second direction from one input-output terminal to other input-output terminal that is opposite to the first direction; a first Raman pump source that generates a first Raman pump light, wherein a Raman gain band of the first Raman pump light includes a frequency of the first signal light but does not include a frequency of the second signal light; a first injection unit that injects the first Raman pump light into the optical fiber transmission line from the other input-output terminal; a second Raman pump source that generates a second Raman pump light, wherein a Raman gain band of the second Raman pump light includes a frequency of the second signal light but does not include a frequency of the first signal light; and a second injection unit that injects the second Raman pump light into the optical fiber transmission line from the one input-output terminal, wherein a frequency relationship satisfies a following inequality $|f_{s1}-f_0| \neq |f_{p2}-f_0|$ and $|f_{s2}-f_0|\neq|f_{p1}-f_0|$ where $f_0$ is a zero dispersion frequency of the optical fiber transmission line, $f_{s1}$ and $f_{s2}$ are the frequencies of the first signal light and the second signal light, respectively, and $f_{p1}$ and $f_{p2}$ are frequencies of the first Raman pump light and the second Raman pump light, respectively.

According to this aspect, by selecting $f_{s1}$, $f_{s2}$, $f_{p1}$, $f_{p2}$, and $f_0$ so that the conditional inequality of $|f_{s1}-f_0|\neq|f_{p2}-f_0|$ and $|f_{s2}-f_0|\neq|f_{p1}-f_0|$ is realized, where $f_0$ is a zero dispersion frequency of the optical fiber transmission line, $f_{s1}$ and $f_{s2}$ are the frequencies of the first signal light and the second signal light, respectively, and $f_{p1}$ and $f_{p2}$ are frequencies of the first Raman pump light and the second Raman pump light, respectively, signal light transmission is performed bidirectionally without being affected by four wave mixing.

In the one-fiber bidirectional optical transmission system according to another aspect of the present invention, the first signal light and the second signal light are frequency-multiplexed signal lights of a plurality of different wavelengths, respectively.

According to this aspect, by selecting $f_{s1\_i}$, $f_{s2\_i}$, $f_{p1}$, $f_{p2}$, and $f_0$ so that the conditional inequality of $|f_{s1\_i}-f_0|\neq|f_{p2}-f_0|$ and $|f_{s2\_j}-f_0|\neq|f_{p1}-f_0|$ is realized, where $f_{s1\_i}$ (i=1, 2, ... m) and $f_{s2\_j}$ (j=1, 2, ... n) are respective frequencies of the first frequency-multiplexed signal lights and the second frequency-multiplexed signal lights, respectively, $f_0$ is a zero dispersion frequency of the optical fiber transmission line, and $f_{p1}$ and $f_{p2}$ are the frequencies of the first Raman pump light and the second Raman pump light, respectively, signal light transmission is performed bidirectionally without being affected by four wave mixing.

In the one-fiber bidirectional optical transmission system according to still another aspect of the present invention, each of the first Raman pump light and the second Raman pump light is a plurality of Raman pump lights of different wavelengths.

According to this aspect, the first Raman pump lights and the second Raman pump lights are respectively Raman pump lights of different wavelengths, and the first Raman pump lights and the second Raman pump lights have different frequencies. By selecting $f_{s1}$, $f_{s2}$, $f_{p1\_k}$, and $f_{p2\_h}$ and $f_0$ so that the conditional inequality of $|f_{s1}-f_0|\neq|f_{p2\_h}-f_0|$ and $|f_{s2}-f_0|\neq|f_{p1-k}-f_0|$ is realized, where, $f_{s1}$ and $f_{s2}$ are the frequencies of the first signal light and the second signal light, respectively, $f_0$ is a zero dispersion frequency of the optical fiber transmission line, and $f_{p1\_k}$ (k=1, 2, ... r) and $f_{p2\_h}$ (h=1, 2, ... , s) are respective frequencies of the first frequency-multiplexed Raman pump lights and the second frequency-multiplexed Raman pump lights, respectively, signal light transmission is performed bidirectionally without being affected by four wave mixing.

In the one-fiber bidirectional optical transmission system according to still another aspect of the present invention, when wavebands of the first signal light and the second signal light are 1550 nanometers and 1580 nanometers, respectively, the optical fiber transmission line is a non-zero dispersion shifted fiber with a zero dispersion wavelength at 1500 nanometer waveband.

According to this aspect, since a non-zero dispersion shifted fiber with a zero dispersion wavelength at 1500 nanometer waveband is used for the optical fiber transmission line, wherein the wavebands of the first signal light and the second signal light are 1550 nanometers and 1580 nanometers, respectively, signal light transmission with less signal transmission loss is performed bidirectionally without being affected by four wave mixing.

A one-fiber bidirectional optical transmission system according to still another aspect of the present invention includes an optical fiber transmission line that transmits a first signal light and a second signal light, wherein the first signal light is transmitted in a first direction from one input-output terminal to other input-output terminal, and the second signal light is transmitted in a second direction that is opposite to the first direction; a first Raman pump source that generates a first Raman pump light, wherein a Raman gain band of the first Raman pump light includes a frequency of the first signal light but does not include a frequency of the second signal light; a first injection unit that injects the first Raman pump light into the optical fiber transmission line from the other input-output terminal; a second Raman pump source that generates a second Raman pump light, wherein a Raman gain band of the second Raman pump light includes a frequency of the second signal light but does not include a frequency of the first signal light; and a second injection unit that injects the second Raman pump light into the optical fiber transmission line from the one input-output terminal, wherein planes of polarization of the first signal light and the second Raman pump light are orthogonal when a frequency relationship satisfies $|f_{s1}-f_0|=|f_{p2}-f_0|$, and planes of polarization of the second signal light and the first Raman pump light are orthogonal when a frequency relationship satisfies $|f_{s2}-f_0|=|f_{p1}-f_0|$, where $f_0$ is a zero dispersion frequency of the optical fiber transmission line, $f_{s1}$ and $f_{s2}$ are the frequencies of the first signal light and the second signal light, respectively, and $f_{p1}$ and $f_{p2}$ are the frequencies of the first Raman pump light and the second Raman pump light, respectively.

According to this aspect, since the planes of polarization of the first signal light and the second Raman pump light are orthogonal when a frequency relationship satisfies $|f_{s1}-f_0|=|f_{p2}-f_0|$, and the planes of polarization of the second signal light and the first Raman pump light are orthogonal when a frequency relationship satisfies $|f_{s2}-f_0|=|f_{p1}-f_0|$, where, $f_0$ is a zero dispersion frequency of the optical fiber transmission line, $f_{s1}$ and $f_{s2}$ are the frequencies of the first signal and the second signal, respectively, and $f_{p1}$ and $f_{p2}$ are the frequencies of the first Raman pump light and the second Raman pump light, respectively, signal light transmission is performed bidirectionally without being affected by four wave mixing.

In the one-fiber bidirectional optical transmission system according to still another aspect of the present invention, the first signal light and the second signal light are frequency-multiplexed signal lights of a plurality of different wavelengths, respectively.

According to this aspect, even when the first signal light and the second signal light are frequency-multiplexed signal lights of different wavelengths, respectively, planes of polarization of the first frequency-multiplexed signal lights and the second Raman pump light are orthogonal when the frequency relationship satisfies $|f_{s1\_i}-f_0|=|f_{p2}-f_0|$, and planes of polarization of the second frequency-multiplexed signal lights and the first Raman pump light are orthogonal when the frequency relationship satisfies $|f_{s2\_j}-f_0|=|f_{p1}-f_0|$, where, $f_0$ is a zero dispersion frequency of the optical fiber transmission line, $f_{s1\_i}$ (i=1, 2, ..., m) and $f_{s2\_j}$ (j=1, 2, ..., n) are respective frequencies of the first frequency-multiplexed signal lights and the second frequency-multiplexed signal lights, respectively, and $f_{p1}$ and $f_{p2}$ are the frequencies of the first Raman pump light and the second Raman pump light, respectively. As a result, signal light transmission is performed bidirectionally without being affected by four wave mixing.

In the one-fiber bidirectional optical transmission system according to still another aspect of the present invention, each of the first Raman pump light and the second Raman pump light is a plurality of Raman pump lights of different wavelengths.

According to this aspect, even when the first Raman pump lights and the second Raman pump lights are respectively Raman pump lights of different wavelengths, when the first signal light and the second signal light are respectively one, planes of polarization of the first signal light and the second Raman pump lights are orthogonal when the frequency relationship satisfies $|f_{s1}-f_0|=|f_{p2\_h}-f_0|$, and planes of polarization of the second signal light and the first Raman pump lights are orthogonal when the frequency relationship satisfies $|f_{s2}-f_0|=|f_{p1\_k}-f_0|$, where $f_0$ is a zero dispersion frequency of the optical fiber transmission line, $f_{s1}$ and $f_{s2}$ are the frequencies of the first signal and the second signal, respectively, and $f_{p1\_k}$ (k=1, 2, ... r) and $f_{p2\_h}$ (h=1, 2, ..., s) are respective frequencies of the first frequency-multiplexed Raman pump lights and the second frequency-multiplexed Raman pump lights, respectively; and when the first signal light and the second signal light are respectively multiplexed signal lights, planes of polarization of the first frequency-multiplexed signal lights and the second Raman pump lights are orthogonal when the frequency relationship satisfies $|f_{s1\_i}-f_0|=|f_{p2\_h}-f_0|$, and planes of polarization of the second frequency-multiplexed signal lights and the first Raman pump lights are orthogonal when the frequency relationship satisfies $|f_{s2\_j}-f_0|=|f_{p1\_k}-f_0|$, where $f_0$ is a zero dispersion frequency of the optical fiber transmission line, $f_{s1\_i}$ (i=1, 2, ..., m) and $f_{s2\_j}$ (j=1, 2, ..., n) are respective frequencies of the first frequency-multiplexed signal lights and the second frequency-multiplexed signal lights, respectively, and $f_{p1\_k}$ (k=1, 2, ... r) and $f_{p2\_h}$ (h=1, 2, ..., s) are respective frequencies of the first frequency-multiplexed Raman pump lights and the second frequency-multiplexed Raman pump lights, respectively. As a result, signal light transmission is performed bidirectionally without being affected by four wave mixing.

A one-fiber bidirectional optical transmission system according to still another aspect of the present invention includes an optical fiber transmission line that transmits a first signal light and a second signal light, wherein the first signal light is transmitted in a first direction from one input-output terminal to other input-output terminal, and the second signal light is transmitted in a second direction that is opposite to the first direction; a first Raman pump source that generates a first Raman pump light, wherein a Raman gain band of the first Raman pump light includes a frequency of the first signal light but does not include a frequency of the second signal light; a first injection unit that injects the first Raman pump light into the optical fiber transmission line from the other input-output terminal; a second Raman pump source that generates a second Raman pump light, wherein a Raman gain band of the second Raman pump light includes a frequency of the second signal light but does not include a frequency of the first signal light; and a second injection unit that injects the second Raman pump light into the optical fiber transmission line from the one input-output terminal, wherein the optical fiber transmission line includes first optical fiber transmission lines that are portions of the optical fiber transmission line near the one input-output terminal and the other input-output terminal, respectively, and a second optical fiber transmission line that is a portion of the optical fiber transmission line between the two first optical fiber transmission lines, and a frequency relationship satisfies a following inequality, $|f_{s1}-f_{1\_0}|\neq|f_{p2}-f_{1\_0}|$ and $|f_{s2}-f_{1\_0}|\neq|f_{p1}-f_{1\_0}|$, where $f_{1\_0}$ is a zero dispersion frequency of the first optical fiber transmission line, $f_{s1}$ and $f_{s2}$ are the frequencies of the first signal light and the second signal light, respectively, and $f_{p1}$ and $f_{p2}$ are the frequencies of the first Raman pump light and the second Raman pump light, respectively.

According to this aspect, the one-fiber bidirectional optical transmission system includes the first operation transmission lines that are portions of the optical fiber transmission line near the one input-output terminal and the other input-output terminal, respectively, and a second optical fiber transmission line that is a portion of the optical fiber transmission line between the two first optical fiber transmission lines, and by selecting $f_{s1}$, $f_{s2}$, $f_{p1\_k}$, $f_{p2\_h}$, and $f_{1\_0}$ so that the conditional inequality of $|f_{s1}-f_{1\_0}|\neq|f_{p2}-f_{1\_0}|$ and $|f_{s2}-f_{1\_0}|\neq|f_{p1}-f_{1\_0}|$ is realized, where, $f_{1\_0}$ is a zero dispersion frequency of the first optical fiber transmission line, $f_{s1}$ and $f_{s2}$ are the frequencies of the first signal light and the second signal light, respectively, and $f_{p1}$ and $f_{p2}$ are the frequencies of the first Raman pump light and the second Raman pump light, respectively, signal light transmission is performed bidirectionally without being affected by four wave mixing.

In the one-fiber bidirectional optical transmission system according to still another aspect of the present invention, the first signal light and the second signal light are frequency-multiplexed signal lights of a plurality of different wavelengths, respectively.

According to this aspect, by selecting $f_{s1\_i}$, $f_{s2\_j}$, $f_{p1}$, $f_{p2}$, and $f_0$ so that the conditional inequality of $|f_{s1\_i}-f_{1\_0}|\neq|f_{p2}-f_{1\_0}|$ (i=1, 2, ... m) and $|f_{s2\_j}-f_{1\_0}|\neq|f_{p1}-f_{1\_0}|$ (j=1, 2, ... n) is realized, where, $f_{s1\_i}$ (i=1, 2, ... m) and $f_{s2\_j}$ (j=1, 2, ... n) are respective frequencies of the first frequency-multiplexed signal lights and the second frequency-multiplexed signal lights, respectively, $f_{1\_0}$ is a zero dispersion frequency of the first optical fiber transmission lines, and $f_{p1}$ and $f_{p2}$ are the frequencies of the first Raman pump light and the second Raman pump light, respectively, signal light transmission is performed bidirectionally without being affected by four wave mixing.

In the one-fiber bidirectional optical transmission system according to still another aspect of the present invention, each of the first Raman pump light and the second Raman pump light is a plurality of Raman pump lights of different wavelengths.

According to this aspect, the first Raman pump light and the second Raman pump light are respectively Raman pump lights of different wavelengths, and the first Raman pump lights and the second Raman pump lights have different wavelengths from each other. By selecting $f_{s1}$, $f_{s2}$, $f_{p1\_k}$, $f_{p2\_h}$ and $f_{1\_0}$ so that the conditional inequality of $|f-f_{1\_0}|\neq|f_{p2\_h}-f_{1\_0}|$ and $|f_{s2}-f_{1\_0}|\neq|f_{p1-k}-f_{1\_0}|$ is realized, where, $f_{s1}$ and $f_2$ are the frequencies of the first signal light and the second signal light, respectively, $f_{1\_0}$ is a zero dispersion frequency of the first optical fiber transmission lines, and $f_{p1\_k}$ (k=1, 2, . . . r) and $f_{p2\_h}$ (h=1, 2, . . . , s) are respective frequencies of the first frequency-multiplexed Raman pump lights and the second frequency-multiplexed Raman pump lights, respectively, signal light transmission is performed bidirectionally without being affected by four wave mixing.

In the one-fiber bidirectional optical transmission system according to still another aspect of the present invention, the first optical fiber transmission line is a 1.3 micrometer zero dispersion single mode fiber.

According to this aspect, since the 1.3 micrometer zero dispersion single mode fiber is used for the first optical fiber transmission line, signal light transmission with less frequency dispersion is performed without being affected by four wave mixing between the signal light and the pump light, in a section of the first operation transmission line having a strong Raman pump light power.

In the one-fiber bidirectional optical transmission system according to still another aspect of the present invention, the first optical fiber transmission line is a dispersion shifted fiber.

According to this aspect, by using the dispersion shifted fiber for the first optical fiber transmission line, signal light transmission with less signal loss is performed without being affected by four wave mixing between the signal light and the pump light, in the section of the first operation transmission line having a strong Raman pump light power.

In the one-fiber bidirectional optical transmission system according to still another aspect of the present invention, the one-fiber bidirectional optical transmission system is a non-relay transmission system.

According to this aspect, since the one-fiber bidirectional optical transmission system is a non-relay transmission system, signal light transmission with excellent cost effectiveness is performed, without being affected by four wave mixing between the signal light and the pump light.

In the one-fiber bidirectional optical transmission system according to still another aspect of the present invention, the one-fiber bidirectional optical transmission system is a relay transmission system.

According to this aspect, since the one-fiber bidirectional optical transmission system is a relay transmission system, signal light transmission with high transmission quality is performed, without being affected by four wave mixing between the signal light and the pump light.

BRIEF DESCRIPTION OF THE DRAWINGS

FIG. 10($b$) is reception spectra of the frequency-multiplexed signal light.

BEST MODE FOR CARRYING OUT THE INVENTION

Exemplary embodiments of the one-fiber bidirectional optical transmission system according to the present invention will be explained below, with reference to the accompanying drawings.

First Embodiment

Figure 1:
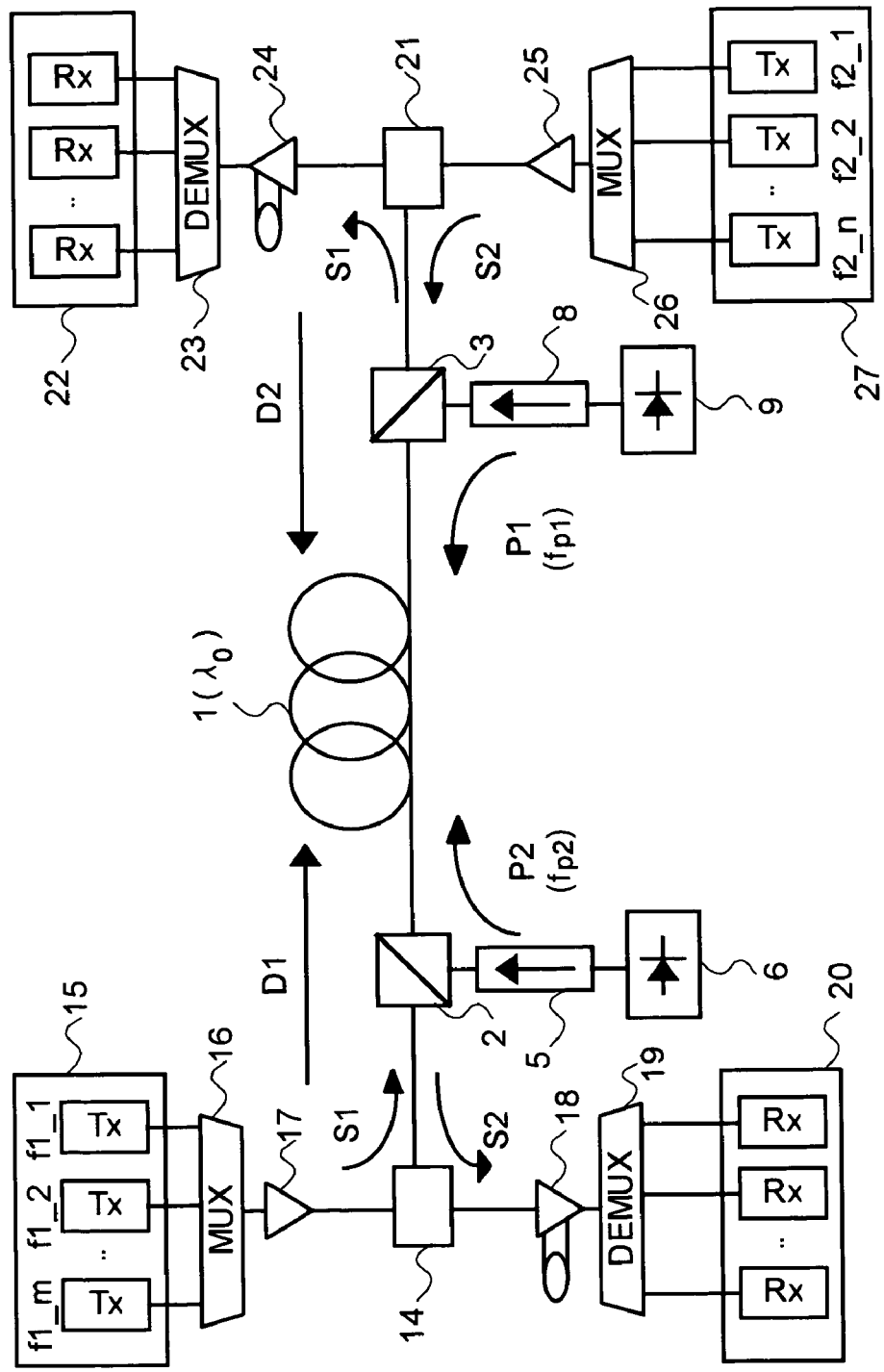
FIG. 1 is a schematic diagram of a one-fiber bidirectional optical transmission system according to the present invention.

FIG. 1 is a schematic diagram of the one-fiber bidirectional optical transmission system according to a first embodiment of the present invention. A frequency-selective optical coupler 2 and a frequency-selective optical coupler 3 are respectively connected to one input-output terminal and the other input-output terminal of an operation transmission line 1. To the optical coupler 2 are connected an optical coupler 14 and an optical isolator 5. To the optical isolator 5 is connected a Raman pump source 6. A second Raman pump light P2 generated by the Raman pump source 6 is injected into the optical coupler 2 via the optical isolator 5.

An optical transmitter 15 includes a plurality of transmitters $Tx_{1\_1}$ to $Tx_{1\_m}$, and these transmitters $Tx_{1\_1}$ to $Tx_{1\_m}$ respectively generate signal lights of different frequencies ($f_{1\_1}$ to $f_{1\_m}$). A frequency band where the signal lights are generated is, for example, a frequency band of from 191.6 terahertz to 195.9 terahertz (wavebands of from 1530 nanometers to 1565 nanometers), referred to as a conventional band (hereinafter, "C band"). A frequency multiplexer (hereinafter, "MUX") 16 couples signal lights of different wavelengths output from the optical transmitter 15, and outputs first frequency-multiplexed signal lights S1. The generated first frequency-multiplexed signal lights S1 are amplified by an optical amplifier 17, and input to the optical coupler 2 via the optical coupler 14.

Similarly, an optical transmitter 27 includes a plurality of transmitters $Tx_{2\_1}$ to $Tx_{2\_n}$, and these transmitters $Tx_{2\_1}$ to $Tx_{2\_n}$ respectively generate signal lights of different frequencies ($f_{2\_1}$ to $f_{2\_n}$). A frequency band where the signal lights are generated is, for example, a frequency band of from 184.5 terahertz to 191.6 terahertz (wavebands of from 1565 nanometers to 1625 nanometers), referred to as a long wavelength band (hereinafter, "L band"). A MUX 26 couples signal lights of different wavelengths output from the optical transmitter 27, and outputs second frequency-multiplexed signal lights S2. The second frequency-multiplexed signal lights S2 are amplified by an optical amplifier 25, and input to the optical coupler 3 via an optical coupler 21.

The first frequency-multiplexed signal lights S1 output from the optical coupler 3 are input to a dispersion-compensating optical amplifier 24 via the optical coupler 21, amplified, separated into signal lights of respective frequencies by a demultiplexer (hereinafter, "DEMUX") 23, and then input to an optical receiver 22. The optical receiver 22 includes a plurality of receivers $Rx_{1\_1}$ to $RX_{1\_m}$, which receive signal lights of respective frequencies. The optical coupler 24 may not be the dispersion-compensating type.

Similarly, the second frequency-multiplexed signal lights S2 output from the optical coupler 2 are input to a dispersion-compensating optical amplifier 18 via the optical coupler 14, amplified, separated into signal lights of respective frequencies by a DEMUX 19, and then input to an optical receiver 20. The optical receiver 20 includes a plurality of receivers $Rx_{2\_1}$ to $RX_{2\_n}$, which receive signal lights of respective frequencies. The optical coupler 18 may not be the dispersion-compensating type.

A first Raman pump light P1 generated by a Raman pump source 9 is a pump light of a predetermined frequency satisfying a condition that a Raman gain band includes all frequencies of the first frequency-multiplexed signal lights S1 but does not include all frequencies of the second frequency-multiplexed signal lights S2. Similarly, a second Raman pump light P2 generated by the Raman pump source 6 is a pump light of a predetermined frequency satisfying a condition that a Raman gain band includes all frequencies of the second frequency-multiplexed signal lights S2 but does not include all frequencies of the first frequency-multiplexed signal lights S1.

The signal lights of different frequencies ($f_{1\_1}$ to $f_{1\_m}$) output from the optical transmitter 15 are coupled by the MUX 16, to become the first frequency-multiplexed signal lights S1. The generated first frequency-multiplexed signal lights S1 are amplified by the optical amplifier 17 so as to be at a desired transmission level, and input to the optical coupler 2 via the optical coupler 14. Further, the second Raman pump light P2 output from the Raman pump source 6 is input to the optical coupler 2 via the optical isolator 5. The multiplexed signal lights of the first frequency-multiplexed signal lights S1 and the second Raman pump light P2 are injected into one input-output terminal of the optical fiber transmission line 1, and transmit in the optical fiber transmission line 1 in a first transmission direction D1 towards the other input-output terminal.

When having approached the other input-output terminal of the optical fiber transmission line 1, the first frequency-multiplexed signal lights S1 transmitted in the first transmission direction D1 are sufficiently Raman-amplified to a desired signal level by the first Raman pump light P1 transmitted in a second transmission direction D2, and input to the optical coupler 3. The Raman-amplified first frequency-multiplexed signal lights S1 are input to the optical amplifier 24 from the optical coupler 3 via the optical coupler 21, optically amplified to a desired reception level, and separated to signal lights of respective frequencies by the DEMUX 23. Thereafter, the first frequency-multiplexed signal lights S1 are received for each signal light by the receivers $Rx_{1\_1}$ to $RX_{1\_m}$ equipped in the optical receiver 22. The signal light S1 output from the optical coupler 3 to the optical isolator 8 is blocked by the optical isolator 8, so as not to be input to the Raman pump source 9. Further, the Raman amplification effect by the second Raman pump light P2 does not contribute to the first frequency-multiplexed signal lights S1, and hence the optical power of the second Raman pump light P2 does not decrease except of the loss in the optical fiber transmission line 1.

Similarly, the signal lights of different frequencies ($f_{2\_1}$ to $f_{2\_n}$) output from the optical transmitter 27 are coupled by the MUX 26, to become the second frequency-multiplexed signal lights S2. The generated second frequency-multiplexed signal lights S2 are optically amplified by the optical amplifier 25 so as to be at a desired transmission level, and input to the optical coupler 3 via the optical coupler 21. Further, the first Raman pump light P1 output from the Raman pump source 9 is input to the optical coupler 3 via the optical isolator 8. The multiplexed signal lights of the second frequency-multiplexed signal lights S2 and the first Raman pump light P1 are injected into the other input-output terminal of the optical fiber transmission line 1, and transmit in the optical fiber transmission line 1 in the second transmission direction D2 towards the one input-output terminal.

When having approached the one input-output terminal of the optical fiber transmission line 1, the second frequency-multiplexed signal lights S2 transmitted in the second transmission direction D2 is sufficiently Raman-amplified to a desired signal level by the second Raman pump light P2 transmitted in the first transmission direction D1. This is because the Raman amplification effect by the second Raman pump light P2 does not contribute to the first frequency-multiplexed signal lights S1, as described above, and hence the second Raman pump light P2 does not attenuate except of the transmission loss, and still has sufficient power.

The Raman-amplified second frequency-multiplexed signal lights S2 are input to the optical amplifier 18 from the optical coupler 2 via the optical coupler 18, optically amplified to a desired reception level, and separated to signal lights of respective frequencies by the DEMUX 19. Thereafter, the second frequency-multiplexed signal lights S2 are received for each signal light by the receivers $Rx_{2\_1}$ to $RX_{2\_n}$ equipped in the optical receiver 20. The signal light S2 output from the optical coupler 2 to the optical isolator 5 is blocked by the optical isolator 5, so as not to be input to the Raman pump source 6. Further, as in the second Raman pump light P2, since the Raman amplification effect by the first Raman pump light P1 does not contribute to the second frequency-multiplexed signal lights S2, the first Raman pump light P1 has sufficient power capable of Raman amplification.

Since the frequencies used by the first frequency-multiplexed signal lights S1 transmitted in the first transmission direction D1 and by the second frequency-multiplexed signal lights S2 transmitted in the second transmission direction D2 are of different frequency bands from each other, and by selecting a frequency such that the first Raman pump light P1 Raman-amplifies only the first frequency-multiplexed signal lights S1, and the second Raman pump light P2 Raman-amplifies only the second frequency-multiplexed signal lights S2, one optical fiber can transmit optical signals bidirectionally.

Figure 3:
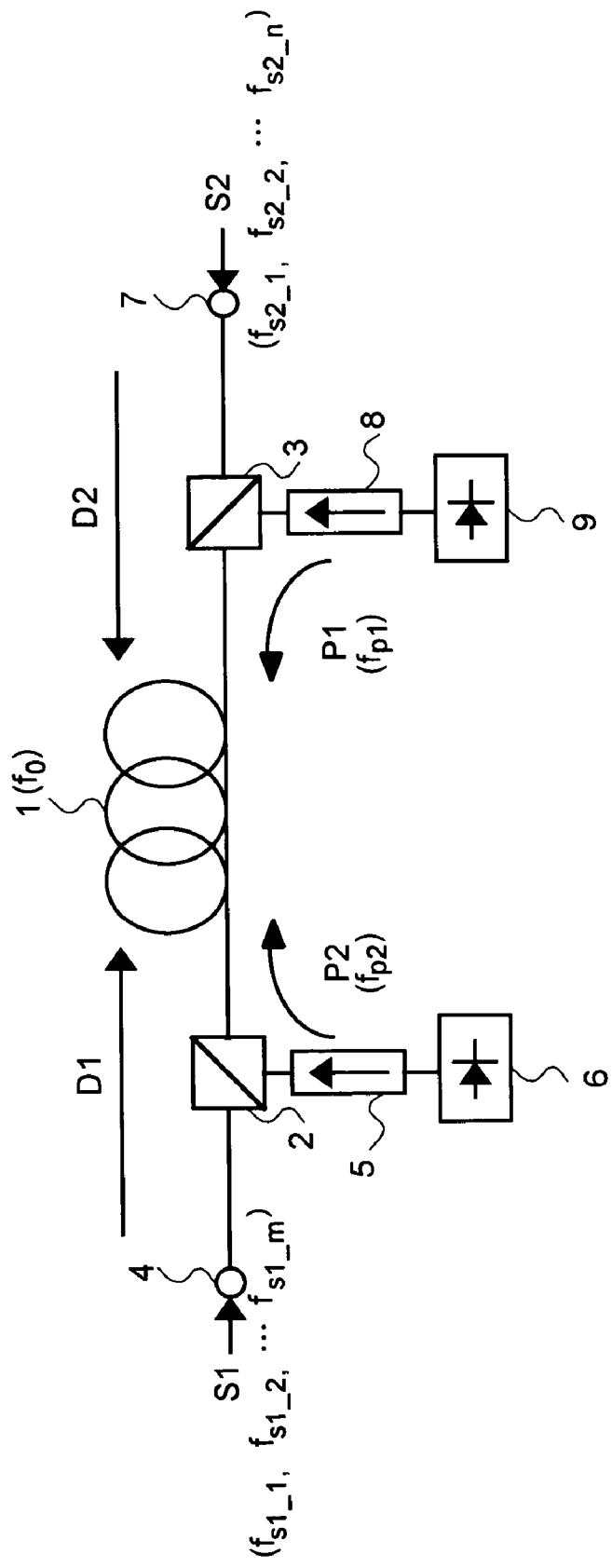
FIG. 3 is a schematic diagram of a one-fiber bidirectional optical transmission system according to a second embodiment.

FIG. 3 is a simplified block diagram of the one-fiber bidirectional optical transmission system shown in FIG. 1. That is, the optical couplers 14 and 21, the optical transmitters 15 and 27, the MUX 16 and 26, the optical amplifiers 17, 18, 24, and 25, and the DEMUX 19 and 23, and the optical receivers 20 and 22 in FIG. 1 are not shown in FIG. 3. It is assumed herein that the frequency-multiplexed signal lights S1 are input from an input-output terminal 4 and output from an input-output terminal 7, and the frequency-multiplexed signal lights S2 are input from the input-output terminal 7 and output from the input-output terminal 4.

The principle that one optical fiber can transmit optical signals bidirectionally by selecting the first and the second signal lights and the first and the second Raman pump lights has been explained above, and it has been also explained that deterioration in the optical signal occurs due to four wave mixing under a certain condition.

The one-fiber bidirectional optical transmission system according to the first embodiment will be explained below. The principle that the influence of the four wave mixing, which occurs due to the relationship amongst the frequencies of the Raman pump light, the zero dispersion frequency of the optical fiber transmission line, and the signal light, can be avoided by appropriately selecting the frequency of the signal light will be explained as well.

Figure 2:
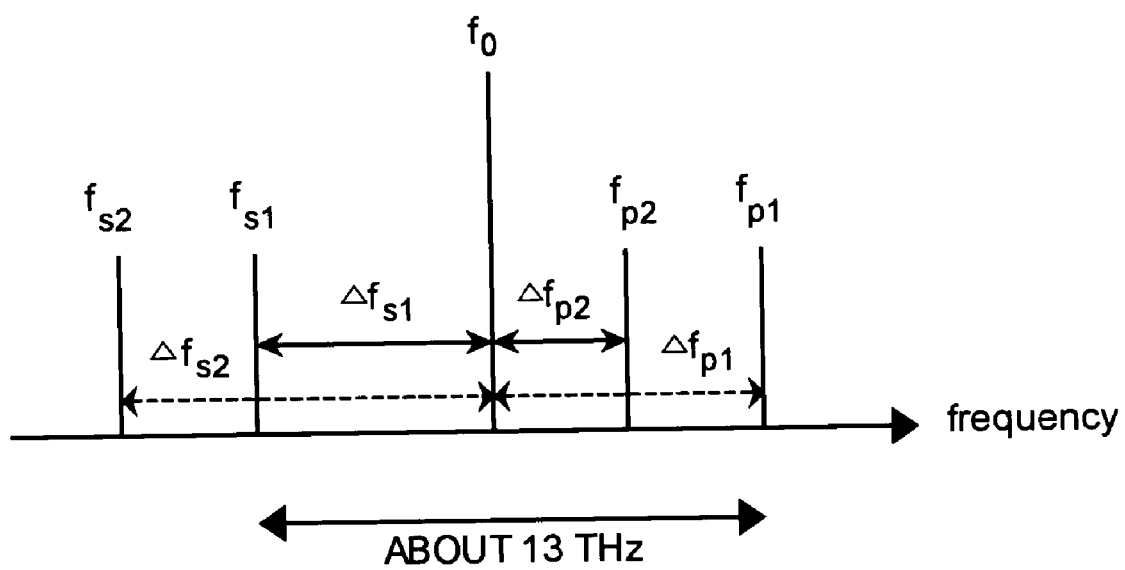
FIG. 2 illustrates a frequency relationship between a signal light and a Raman pump light, according to a first embodiment.

FIG. 2 illustrates a frequency relationship between the signal lights and the Raman pump lights, according to the first embodiment. The configuration of the first embodiment is such that in FIG. 3, the frequency-multiplexed-signal lights S1 and S2 are respectively a single wave.

In FIG. 2, the frequencies of the first signal light S1 and the second signal light S2 are denoted by $f_{s1}$ and $f_{s2}$, respectively, the frequencies of the first Raman pump light P1 and the second Raman pump light P2 are denoted by $f_{p1}$ and $f_{p2}$, respectively, and the zero dispersion frequency of the optical fiber transmission line 1 is denoted by $f_0$. Further, a difference between the zero dispersion frequency of the optical fiber transmission line 1 and the frequency of the first signal light S1 is denoted by $\Delta f_{s1}$, a difference between the zero dispersion frequency of the optical fiber transmission line 1 and the frequency of the second signal light S2 is denoted by $\Delta f_{s2}$, a difference between the frequency of the first Raman pump light P1 and the zero dispersion frequency of the optical fiber transmission line 1 is denoted by $\Delta f_{p1}$, and a difference between the frequency of the second Raman pump light P2 and the zero dispersion frequency of the optical fiber transmission line 1 is denoted by $\Delta f_{p2}$.

Figure 9:
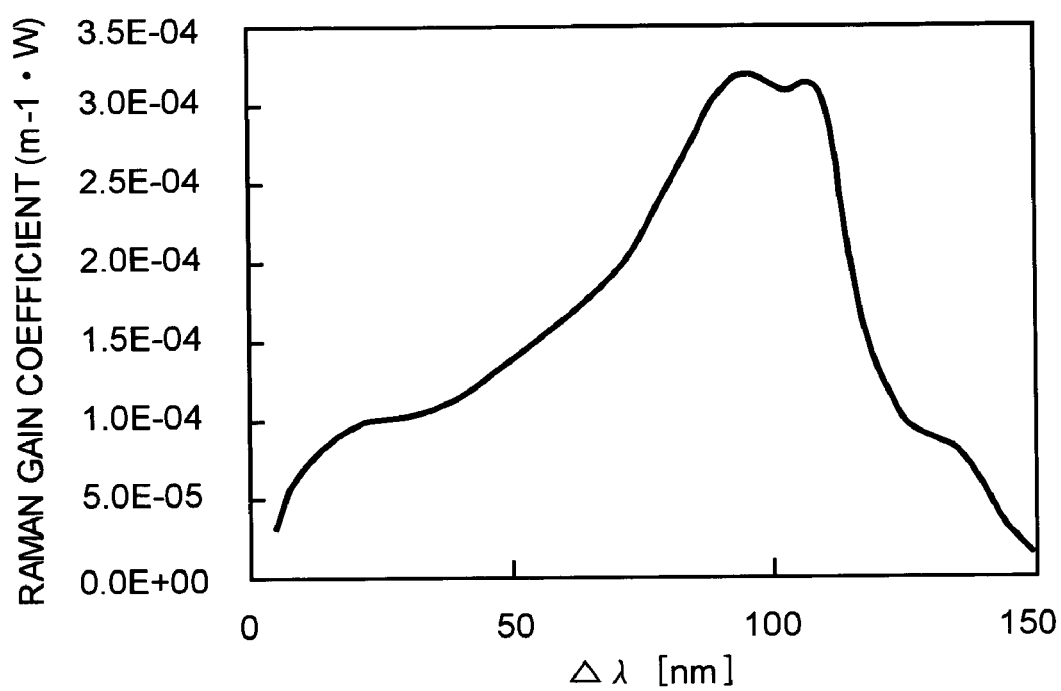
FIG. 9 is a graph of a gain band of a typical Raman amplifier.
Figure 10A:
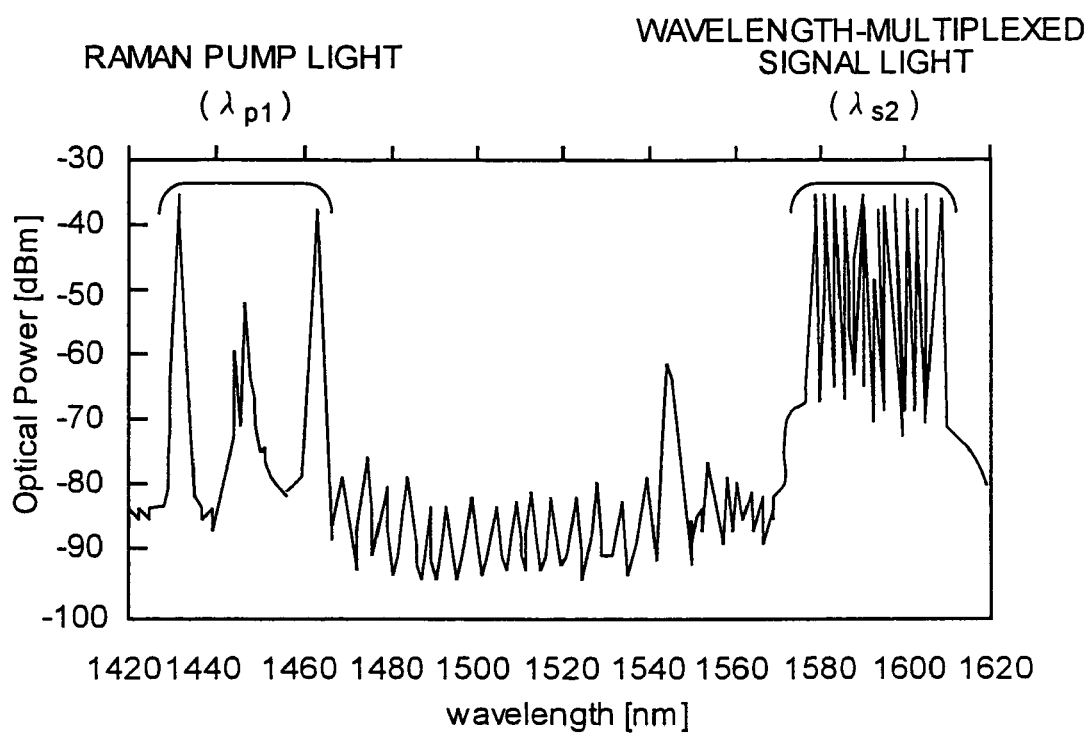
FIG. 10($a$) is spectra of a Raman pump light and a frequency-multiplexed signal light used for the one-fiber bidirectional optical transmission system.
Figure 10B:
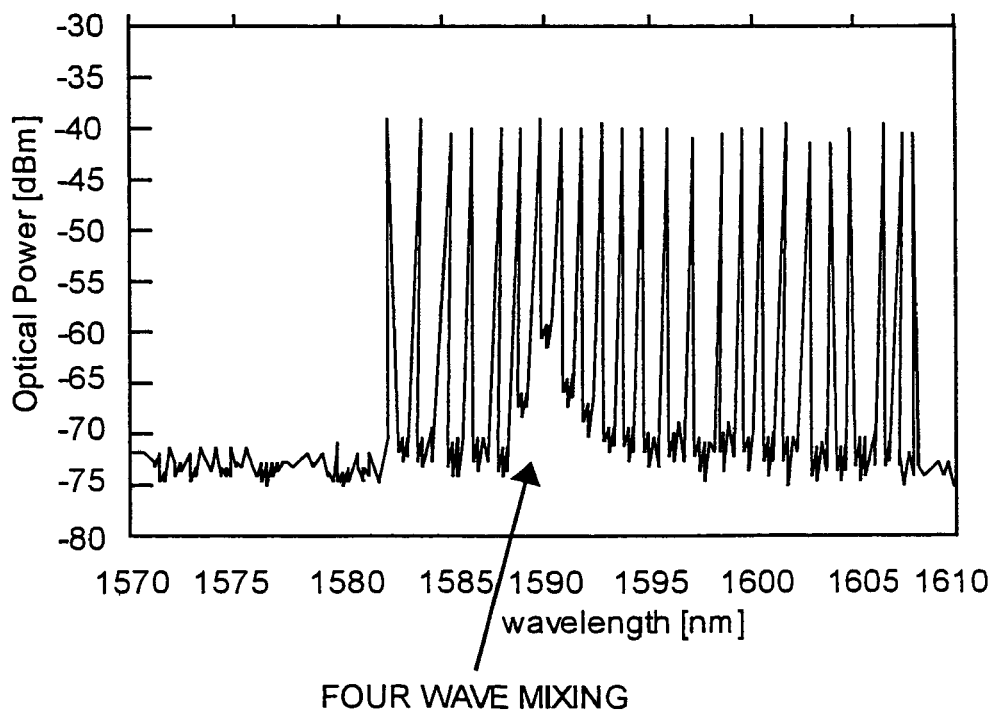

As is shown in FIG. 9, separation by about 100 nanometers in a wavelength difference is required between the Raman pump light and the signal light for obtaining a sufficient Raman amplification effect. Hence, in the example of C band and L band in FIG. 2, separation by about 13 terahertz in a frequency difference (a wavelength difference of 100 nanometers) is taken. Deterioration in signals due to the four wave mixing occurs, when the phase matching conditional equation (1) is realized, with respect to the second signal light. When equation (1) is applied to this example, the following phase matching conditional equation is obtained:

$$|f_{p1}-f_0|=|f_{s2}-f_0| \qquad (2).$$

In chart-wise thinking, this equation indicates that the frequency of the second Raman pump light P2 interferes with the first signal light S1 located in the vicinity of the frequency turned back about the zero dispersion frequency of the optical fiber transmission line 1. In other words, it means that signal transmission is possible without being affected by the four wave mixing, by selecting a frequency of the Raman pump light and a frequency of the signal light, using $\Delta f_{p2}$ and $\Delta f_{p1}$, so that $\Delta f_{s2} > \Delta f_{p1}$, or $\Delta f_{s2} < \Delta f_{p1}$, that is, $\Delta f_{s2} \neq \Delta f_{p1}$. This applies to the frequency relationship between the second signal light S2 and the first Raman pump light P1, and by selecting a frequency of the Raman pump light and a frequency of the signal light such $\Delta f_{s2} \neq \Delta f_{p1}$, the influence of the four wave mixing can be avoided. Therefore, if the condition for avoiding the influence of the four wave mixing is expressed by using $f_{s1}$, $f_{s2}$, $f_{p1}$, and $f_{p2}$, a following equation is obtained:

$$|f_{s1}-f_0|\neq|f_{p2}-f_0| \text{ and } |f_{s2}-f_0|\neq|f_{p1}-f_0|.$$

According to the first embodiment, a one-fiber bidirectional optical transmission system having desired reception characteristics without being affected by four wave mixing bidirectionally can be obtained, by selecting a combination of the first signal light S1, the second signal light S2, the first Raman pump light P1, the second Raman pump light P2, and the zero dispersion frequency of the optical fiber transmission line 1, such that $|f_{s1}-f_0|\neq|f_{p2}-f_0|$ and $|f_{s2}-f_0|\neq|f_{p1}-f_0|$, where $f_0$ is the zero dispersion frequency of the optical fiber transmission line, $f_{s1}$ and $f_{s2}$ are the frequencies of the first signal light S1 and the second signal light S2, respectively, and $f_{p1}$ and $f_{p2}$ are the frequencies of the first Raman pump light and the second Raman pump light, respectively, when a frequency is selected such that the frequencies used in the first signal light S1 transmitted in the first transmission direction D1 and the second signal light S2 transmitted in the second transmission direction D2 are different from each other, and the first Raman pump light P1 Raman-amplifies only the first signal light S1, and the second Raman pump light P2 Raman-amplifies only the second signal light S2.

Second Embodiment

FIG. 3 is a schematic diagram of the one-fiber bidirectional optical transmission system according to a second embodiment of the present invention. In the first embodiment, the first signal light S1 and the second signal light S2 respectively have a single frequency. In the second embodiment, however, the first signal light S1 and the second signal light S2 are respectively frequency-multiplexed signal lights. The pumping method is the backward pumping method as in the first embodiment.

In FIG. 3, the first frequency-multiplexed signal lights S1 are input to the input-output terminal 4, and the second frequency-multiplexed signal lights S2 are input to the input-output terminal 7. The other configuration is the same as that shown in FIG. 1.

The first Raman pump light P1 generated by the Raman pump source 9 is a pump light of a predetermined frequency, wherein a Raman gain band capable of Raman amplification includes frequency bands of the first frequency-multiplexed signal lights S1, but does not include frequency bands of the second frequency-multiplexed signal lights S2. The second Raman pump light P2 generated by the Raman pump source 9 is a pump light of a predetermined frequency, wherein a Raman gain band capable of Raman amplification includes frequency bands of the second frequency-multiplexed signal lights S2, but does not include frequency bands of the first frequency-multiplexed signal lights S1.

Figure 4:
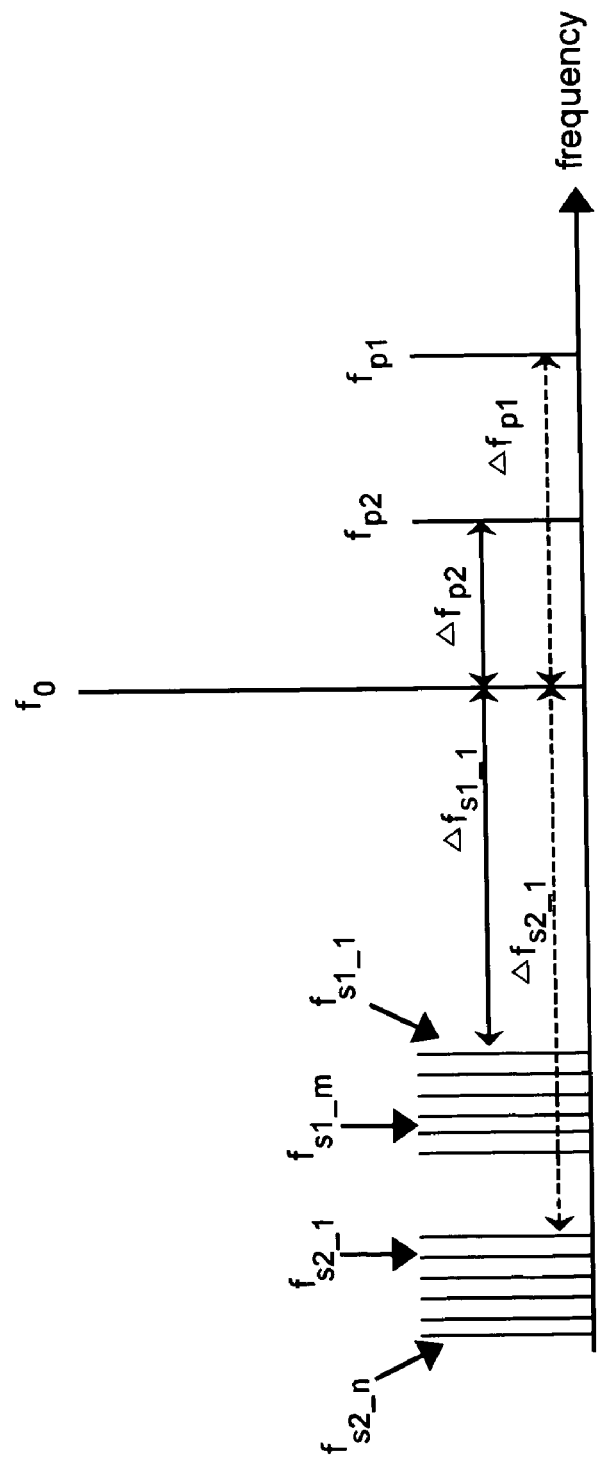
FIG. 4 illustrates a frequency relationship between a frequency-multiplexed signal light and a Raman pump light, according to the second embodiment.

FIG. 4 illustrates a frequency relationship between the frequency-multiplexed signal lights and the Raman pump light, according to the second embodiment. This figure indicates the positions of frequencies, wherein the frequencies of the first frequency-multiplexed signal lights S1 are denoted by $f_{s1\_i}$ (i=1, 2, . . . , m), the frequencies of the second frequency-multiplexed signal lights S2 are denoted by $f_{s2\_j}$ (j=1, 2, . . . , n), the zero dispersion frequency of the optical fiber transmission line 1 is denoted by $f_o$, the frequencies of the first Raman pump light and the second Raman pump light are respectively denoted by $f_{p1}$ and $f_{p2}$. Further, a difference between $f_o$ and $f_{s1\_1}$ is denoted by $\Delta f_{s1\_1}$, a difference between $f_o$ and $f_{s2\_1}$ is denoted by $\Delta f_{s2\_1}$, a difference between $f_{p1}$ and $f_0$ is denoted by $\Delta f_{p1}$, and a difference between $f_{p2}$ and $f_0$ is denoted by $\Delta f_{p2}$. From this figure, it is seen that since there are relations of $\Delta f_{s1\_1} > f_{p2}$ and $\Delta f_{s2\_1} > f_{p1}$, and conditions of $f_{s1\_1} \neq f_{p2}$ and $f_{s2\_1} \neq f_{p1}$ are realized, there is no influence of the four wave mixing. These conditions similarly apply to the frequencies other than $f_{s1\_1}$ and $f_{s2\_1}$. Therefore, if the condition for avoiding the influence of the four wave mixing is expressed by using by $f_{s1\_i}$ (i=1, 2, ..., m), $f_{s2\_j}$ (j=1, 2, ..., n), $f_{p1}$, $f_{p2}$, and $f_o$, a following inequality is obtained: $|f_{s1\_i}-f_0| \neq |f_{p2}-f_0|$ (i=1, 2, ..., m), and $|f_{s2\_j}-f_0| \neq |f_{p1}-f_0|$ (j=1, 2, ..., n).

According to the second embodiment, a one-fiber bidirectional optical transmission system having desired reception characteristics without being affected by four wave mixing bidirectionally can be obtained, by selecting a combination of the first frequency-multiplexed signal lights S1, the second frequency-multiplexed signal lights S2, the first Raman pump light P1, the second Raman pump light P2, and the zero dispersion frequency of the optical fiber transmission line 1, such that $|f_{1\_i}-f_0| \neq |f_{p2}-f_0|$ and $|f_{s2\_j}-f_0| \neq |f_{p1}-f_0|$, where $f_0$ is the zero dispersion frequency of the optical fiber transmission line, $f_{s1\_i}$ (i=1, 2, ..., m) and $f_{s2\_j}$ (j=1, 2, ..., n) are the frequencies of the first frequency-multiplexed signal lights S1 and the second frequency-multiplexed signal lights S2, respectively, and $f_{p1}$ and $f_{p2}$ are the frequencies of the first Raman pump light and the second Raman pump light, respectively, when a frequency is selected such that the frequencies used in the first frequency-multiplexed signal light S1 transmitted in the first transmission direction D1 and the second frequency-multiplexed signal light S2 transmitted in the second transmission direction D2 are different from each other, and the first Raman pump light P1 Raman-amplifies only the first signal lights S1, and the second Raman pump light P2 Raman-amplifies only the second signal lights S2.

Third Embodiment

Figure 5:
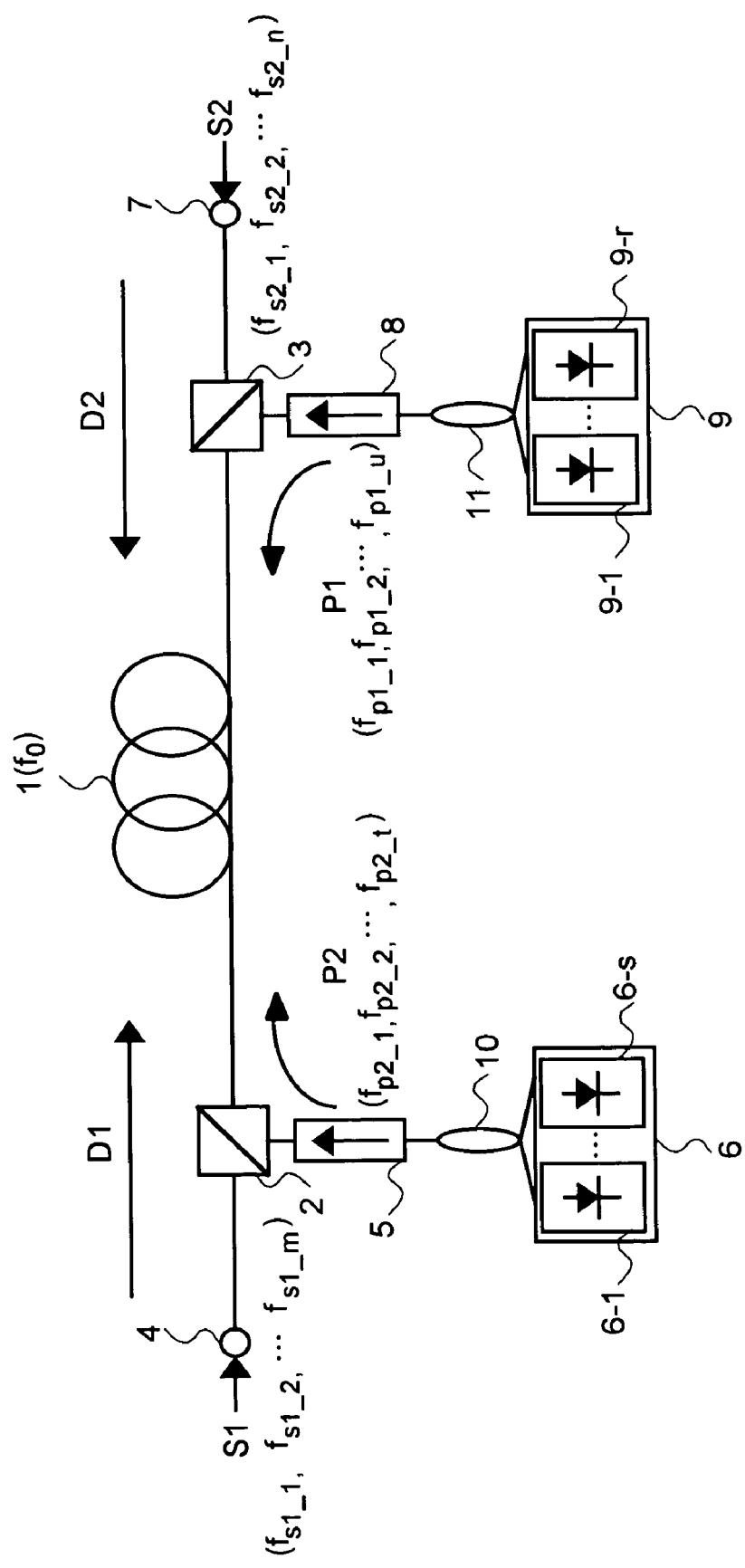
FIG. 5 is a schematic diagram of a one-fiber bidirectional optical transmission system according to a third embodiment.

FIG. 5 is a schematic diagram of the one-fiber bidirectional optical transmission system according to the third embodiment. In the third embodiment, a plurality of Raman pump lights is used instead of the Raman pump light of a single frequency in the second embodiment shown in FIG. 3.

In FIG. 5, Raman pump sources 6 and 9 that generate Raman pump lights of a plurality of frequencies are provided instead of the Raman pump sources 6 and 9 that generate a single Raman pump light, in the configuration shown in FIG. 3. Accompanying this, frequency couplers 10 and 11 are respectively provided between the Raman pump sources 6 and 9 and the optical isolators 5 and 8. The other configuration is the same as that shown in FIG. 3, and hence a part relating to the third embodiment will be mainly explained here.

A plurality of Raman pump sources 9-1, ..., 9-r equipped in a Raman pump source section 9 generate Raman pump lights having frequencies different from each other. The Raman pump lights generated by the Raman pump sources 9-1, ..., 9-r correspond to the first Raman pump light P1 in the second embodiment, and each Raman pump light is a pump light of a predetermined frequency, wherein a Raman gain band capable of Raman amplification includes frequency bands of the first frequency-multiplexed signal lights S1, but does not include frequency bands of the second frequency-multiplexed signal lights S2. Further, a plurality of Raman pump sources 6-1, ..., 6-r equipped in a Raman pump source section 6 generate Raman pump lights having frequencies different from each other. The Raman pump lights generated by the Raman pump sources 6-1, ..., 6-s correspond to the second Raman pump light P2 in the second embodiment, and each Raman pump light is a pump light of a predetermined frequency, wherein a Raman gain band capable of Raman amplification includes frequency bands of the second frequency-multiplexed signal lights S2, but does not include frequency bands of the first frequency-multiplexed signal lights S1.

Figure 6:
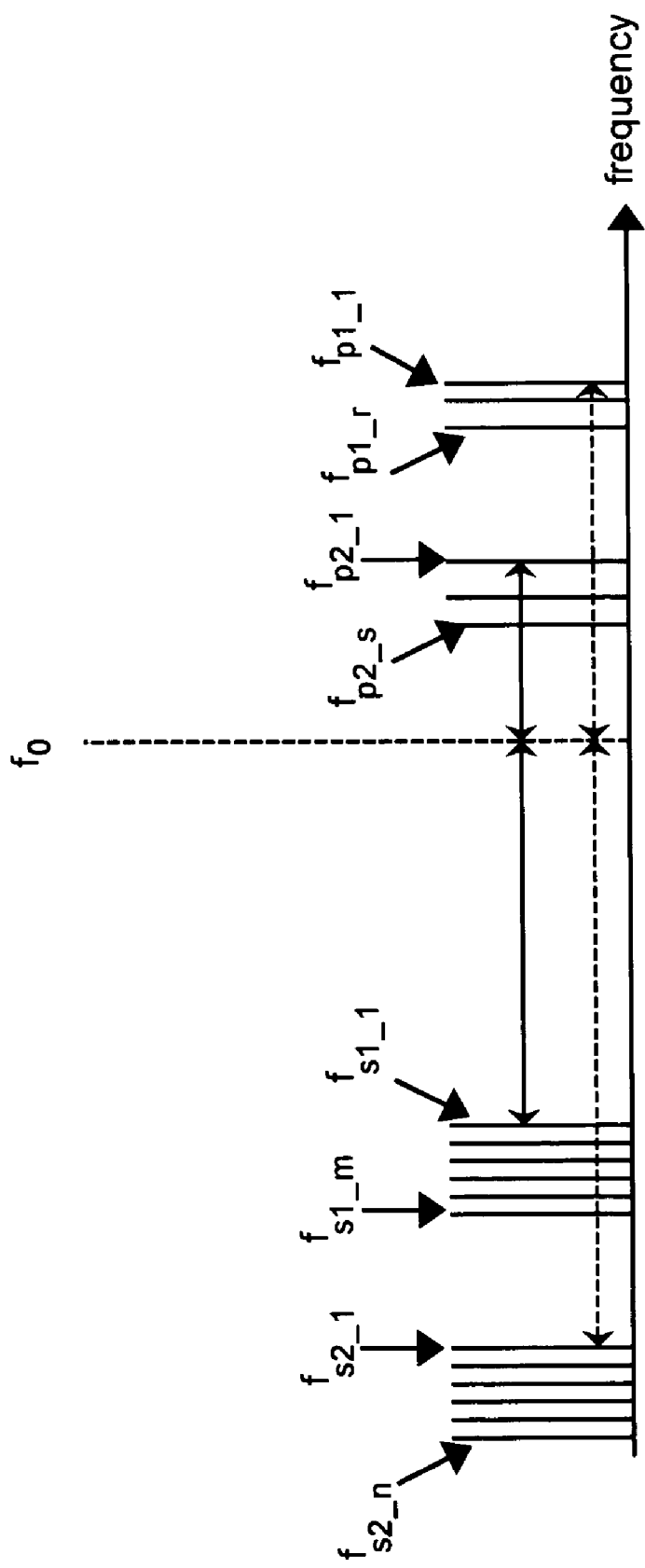
FIG. 6 illustrates a frequency relationship between a frequency-multiplexed signal light and a Raman pump light, according to the third embodiment.

FIG. 6 illustrates a frequency relationship between the frequency-multiplexed signal lights and the Raman pump lights, according to the third embodiment. This figure indicates the positions of frequencies, wherein the frequencies of the first frequency-multiplexed signal lights S1 and the second frequency-multiplexed signal lights S2 are denoted by $f_{s1\_i}$ (i=1, 2, ..., m) and $f_{s2\_j}$ (j=1, 2, ..., n), respectively, the zero dispersion frequency of the optical fiber transmission line 1 is denoted by $f_o$, the frequencies of the first Raman pump lights and the second Raman pump lights are respectively denoted by $f_{p1\_k}$ (k=1, 2, ..., r) and $f_{p2\_h}$ (h=1, 2, ..., s). The concept for avoiding the influence of the four wave mixing is the same as in the second embodiment. As shown in FIG. 6, it is seen that if the frequency relationship is $|f_{s1\_i}-f_0| \neq |f_{p2\_h}-f_0|$ and $|f_{s2\_j}-f_0| \neq |f_{p1\_k}-f_0|$, the phase matching condition is not satisfied, and as a result, the system is not affected by four wave mixing between the signal lights and the Raman pump lights.

According to the third embodiment, a large capacity one-fiber bidirectional optical transmission system having desired bidirectional reception characteristics can be realized, by selecting a combination of the first frequency-multiplexed signal lights S1, the second frequency-multiplexed signal lights S2, the first Raman pump lights P1, the second Raman pump lights P2, and the zero dispersion frequency of the optical fiber transmission line 1, such that a frequency relationship satisfies a following inequality, $|f_{s1\_i}-f_0| \neq |f_{p2\_h}-f_0|$ and $|f_{s2\_j}-f_0| \neq |f_{p1\_k}-f_0|$, where $f_0$ is the zero dispersion frequency of the optical fiber transmission line, $f_{s1\_i}$ (i=1, 2, ..., m) and $f_{s2\_j}$ (j=1, 2, ..., n) are respective frequencies of the first frequency-multiplexed signal lights S1 and the second frequency-multiplexed signal lights S2, respectively, and $f_{p1\_k}$ (k=1, 2, ..., r) and $f_{p2\_h}$ (h=1, 2, ..., s) are respective frequencies of the first Raman pump lights and the second Raman pump lights, respectively, when a frequency is selected such that the frequencies used in the first frequency-multiplexed signal lights S1 transmitted in the first transmission direction D1 and the second frequency-multiplexed signal lights S2 transmitted in the second transmission direction D2 are different from each other, and the first Raman pump lights P1 Raman-amplify only the first frequency-multiplexed signal lights S1, and the second Raman pump lights P2 Raman-amplify only the second frequency-multiplexed signal lights S2. Further, a plurality of first Raman pump lights P1 and a plurality of second Raman pump lights P2 are used as Raman pump lights, allowing the number of frequency multiplication to be increased, and a wider Raman gain band than that of a single-frequency Raman pump light to be obtained.

In the third embodiment, when 1550 nanometer waveband is used for the first frequency-multiplexed signal lights S1, 1580 nanometer waveband is used for the second frequency-multiplexed signal lights S2, and a non-zero dispersion shifted fiber (hereinafter, "NZ-DSF") with a zero dispersion wavelength at 1500 nanometer waveband is used for the optical fiber transmission line, a one-fiber bidirectional optical transmission system having less signal transmission loss can be obtained in addition to the above effects.

Needless to say, 1550 nanometer and 1580 nanometer wavebands can be used for the first frequency-multiplexed signal lights S1 and the second frequency-multiplexed signal lights S2, respectively, and a non-zero dispersion shifted fiber with a zero dispersion wavelength at 1500 nanometer waveband can be used for the optical fiber transmission line also in the first embodiment and the second embodiment.

Fourth Embodiment

Figure 7:
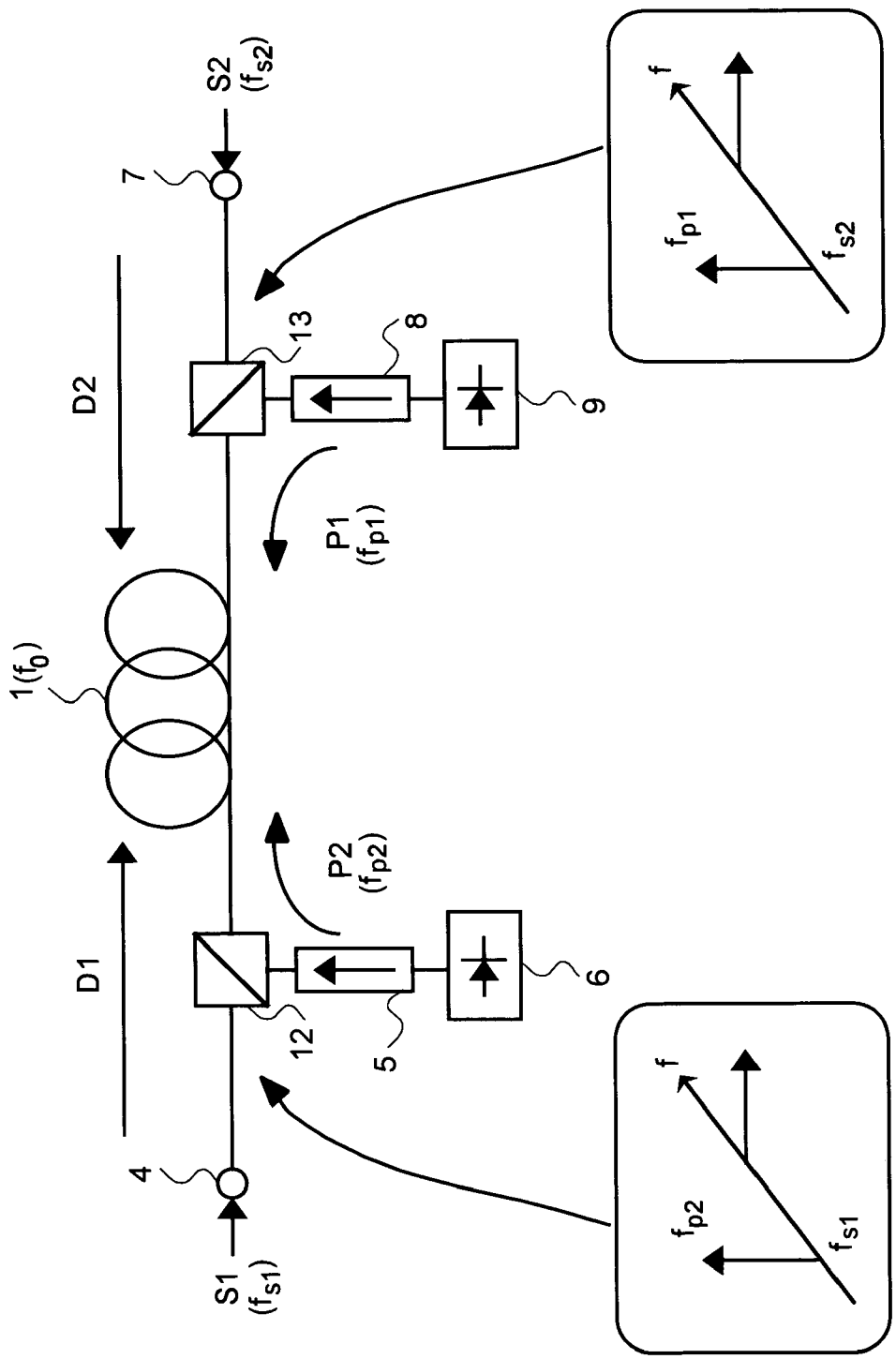
FIG. 7 is a schematic diagram of a one-fiber bidirectional optical transmission system according to a fourth embodiment.

FIG. 7 is a schematic diagram of the one-fiber bidirectional optical transmission system according to the fourth embodiment. In the fourth embodiment, polarization-holding optical couplers 12 and 13 are inserted so that planes of polarization of the first signal light S1 and the second Raman pump light P2 are orthogonal, and planes of polarization of the second signal light S2 and the first Raman pump light P1 are orthogonal. Other configuration is the same as that in the first embodiment, and hence, only a part relating to the fourth embodiment will be explained here.

In FIG. 7, since planes of polarization of the first signal light S1 and the second Raman pump light P2 are orthogonal, and planes of polarization of the second signal light S2 and the first Raman pump light P1 are orthogonal, the phase matching condition is not satisfied. As a result, respective signal lights are transmitted, without being affected by four wave mixing between the signal lights and the Raman pump lights.

In FIG. 7, the first signal light S1, the second signal light S2, the first Raman pump light P1, and the second Raman pump light P2 are respectively a single wave. However, needless to say, the first signal light S1 and the second signal light S2 may be frequency-multiplexed signal lights including a plurality of signal lights of different frequencies, respectively, and the first Raman pump light P1 and the second Raman pump light P2 may be a plurality of Raman pump lights of different frequencies, respectively.

According to the fourth embodiment, since the frequencies used in the first frequency-multiplexed signal lights S1 transmitted in the first transmission direction D1 and the second frequency-multiplexed signal lights S2 transmitted in the second transmission direction D2 are different from each other, and signal lights are selected such that planes of polarization of the first signal light S1 and the second Raman pump light P2 are orthogonal, and planes of polarization of the second signal light S2 and the first Raman pump light P1 are orthogonal, the phase matching condition is not satisfied. As a result, respective signal lights can be transmitted, without being affected by four wave mixing between the signal lights and the Raman pump lights.

Fifth Embodiment

Figure 8:
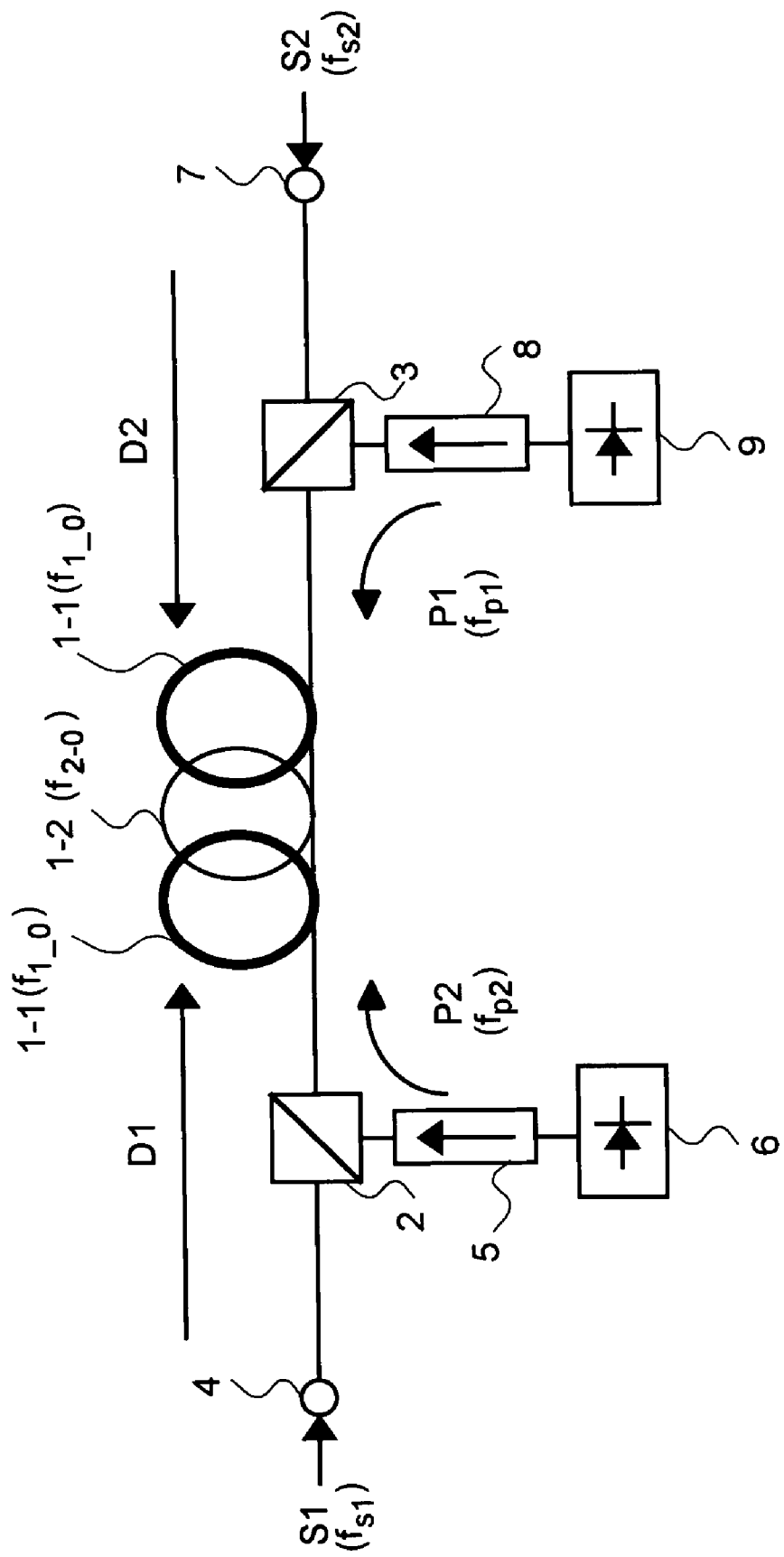
FIG. 8 is a schematic diagram of a one-fiber bidirectional optical transmission system, according to a fifth embodiment.

FIG. 8 is a schematic diagram of the one-fiber bidirectional optical transmission system according to the fifth embodiment. In the fifth embodiment, the optical fiber transmission line 1 in the first embodiment is divided into a first optical fiber transmission line 1_1 and a second optical fiber transmission line 1_2, wherein the first optical fiber transmission line 1_1 is arranged on the input-output terminal side of the signal lights, and a frequency relationship satisfies an inequality, $|f_{s1}-f_{1\_0}| \neq |f_{p2}-f_{1\_0}|$ and $|f_{s2}-f_{1\_0}| \neq |f_{p1}-f_{1\_0}|$, where $f_{1\_0}$ is the zero dispersion frequency of the first optical fiber transmission line, $f_{s1}$ and $f_{s2}$ are the frequencies of the first signal light S1 and the second signal light S2, respectively, and $f_{p1}$ and $f_{p2}$ are the frequencies of the first Raman pump lights and the second Raman pump lights, respectively. Other configuration is the same as that of the first embodiment.

Since a frequency relationship satisfies a following inequality, $|f_{s1}-f_{1\_0}| \neq |f_{p2}-f_{1\_0}|$ and $|f_{s2}-f_{1\_0}| \neq |f_{p1}-f_{1\_0}|$, where $f_{1\_0}$ is the zero dispersion frequency of the first optical fiber transmission line, $f_{s1}$ and $f_{s2}$ are the frequencies of the first signal light S1 and the second signal light S2, respectively, and $f_{p1}$ and $f_{p2}$ are the frequencies of the first Raman pump lights and the second Raman pump lights, respectively, the phase matching condition is not satisfied in a section of the first optical fiber transmission line 1_1 having strong Raman pump light power. As a result, respective signal lights can be transmitted without being affected by four wave mixing between the signal lights and the Raman pump lights.

The length of the section of the first optical fiber transmission line 1_1 is determined according to relative relations of the strength of the signal lights, the strength of the Raman pump lights, and the distance between the transmission sections. For example, when the Raman pump light power is increased in order to ensure the signal strength at the reception end, four wave mixing is likely to occur, and hence, it is necessary to increase the length of the section of the first optical fiber transmission line 1_1. At this time, in the section of the second optical fiber transmission line 1_2, it is not necessary to worry about the influence of the four wave mixing. Therefore, the degree of freedom in selecting an optical fiber having small wavelength dispersion or having a small transmission loss increases.

In FIG. 8, the first signal light S1, the second signal light S2, the first Raman pump light P1, and the second Raman pump light P2 are respectively a single wave. However, needless to say, the first signal light S1 and the second signal light S2 may be frequency-multiplexed signal lights including a plurality of signal lights of different frequencies, respectively, and the first Raman pump light P1 and the second Raman pump light P2 may be a plurality of Raman pump lights of different frequencies, respectively.

Similarly, the first optical fiber transmission line 1_1 may be a 1.3-micrometer zero-dispersion single-mode fiber (hereinafter, "SMF"), or a dispersion shifted fiber (hereinafter, "DSF").

Further, the one-fiber bidirectional optical transmission system according to the present invention may be a non-relay transmission system or a relay transmission system.

According to the fifth embodiment, since the frequency relationship satisfies the inequality, $|f_{s1}-f_{1\_0}| \neq |f_{p2}-f_{1\_0}|$ and $|f_{s2}-f_{1\_0}| \neq |f_{p1}-f_{1\_0}|$, where $f_{1\_0}$ is the zero dispersion frequency of the first optical fiber transmission line, $f_{s1}$ and $f_{s2}$ are the frequencies of the first signal light S1 and the second signal light S2, respectively, and $f_{p1}$ and $f_{p2}$ are frequencies of the first Raman pump lights and the second Raman pump lights, respectively, the phase matching condition is not satisfied in the section of the first optical fiber transmission line 1_1 having strong Raman pump light power. As a result, respective signal lights can be transmitted without being affected by four wave mixing between the signal lights and the Raman pump lights.

As explained above, according to the one-fiber bidirectional optical transmission system of one aspect of the present invention, there is the effect that a one-fiber bidirectional optical transmission system having desired reception characteristics without being affected by four wave mixing bidirectionally can be obtained, by selecting $f_{s1}$, $f_{s2}$, $f_{p1}$, $f_{p2}$, and $f_0$, such that a frequency relationship satisfies the inequality, $|f_{s1}-f_0| \neq |f_{p2}-f_0|$ and $|f_{s2}-f_0| \neq |f_{p1}-f_0|$, where $f_0$ is the zero dispersion frequency of the optical fiber transmission line, $f_{s1}$ and $f_{s2}$ are the frequencies of the first signal light S1 and the second signal light S2, respectively, and $f_{p1}$ and $f_{p2}$ are frequencies of the first Raman pump light and the second Raman pump light, respectively.

According to the one-fiber bidirectional optical transmission system of another aspect of the present invention, there is the effect that a one-fiber bidirectional optical transmission system having desired reception characteristics without being affected by four wave mixing bidirectionally can be obtained, by selecting $f_{s1\_i}$, $f_{s2\_j}$, $f_{p1}$, $f_{p2}$, and $f_0$, such that a frequency relationship satisfies the inequality, $|f_{s1\_i}-f_0|\neq|f_{p2}-f_0|$ and $|f_{s2\_j}-f_0|\neq|f_{p1}-f_0|$, where $f_{s1\_i}$ (i=1, 2, ..., m) and $f_{s2\_j}$ (j=1, 2, ..., n) are the frequencies of the first frequency-multiplexed signal light S1 and the second frequency-multiplexed signal light S2, respectively, $f_0$ is the zero dispersion frequency of the optical fiber transmission line, and $f_{p1}$ and $f_{p2}$ are frequencies of the first Raman pump light and the second Raman pump light, respectively.

According to the one-fiber bidirectional optical transmission system of still another aspect of the present invention, there is the effect that a large capacity one-fiber bidirectional optical transmission system having desired reception characteristics without being affected by four wave mixing bidirectionally can be obtained, the number of frequency multiplication can be increased, and a wider Raman gain band than that of a single-frequency Raman pump light can be obtained, by selecting $f_{s1}$, $f_{s2}$, $f_{p1\_k}$, $f_{p2\_h}$, and $f_0$, such that a frequency relationship satisfies the inequality, $|f_{s1}-f_0|\neq|f_{p2\_h}-f_0|$ and $|f_{s2}-f_0|\neq|f_{p1\_k}-f_0|$, where $f_{s1}$ and $f_{s2}$ are the frequencies of the first signal light S1 and the second signal light S2, respectively, $f_0$ is the zero dispersion frequency of the optical fiber transmission line, and $f_{p1\_k}$ (k=1, 2, ..., r) and $f_{p2\_h}$ (h=1, 2, ..., s) are the frequencies of the first frequency-multiplexed Raman pump lights and the second frequency-multiplexed Raman pump lights, respectively, and the first Raman pump lights and the second Raman pump lights are Raman pump lights having a plurality of frequencies, respectively, and the frequencies of the Raman pump lights and the second Raman pump lights are different from each other.

According to the one-fiber bidirectional optical transmission system of still another aspect of the present invention, by using 1550 nanometer waveband for the first signal light, 1580 nanometer waveband for the second signal light S2, and a non-zero dispersion shifted fiber with a zero dispersion wavelength at 1500 nanometer waveband for the optical fiber transmission line, a large capacity one-fiber bidirectional optical transmission system having desired reception characteristics without being affected by four wave mixing bidirectionally can be realized, the number of frequency multiplication can be increased, a wider Raman gain band than that of a single-frequency Raman pump light can be obtained, and signal light transmission with less signal transmission loss can be realized.

According to the one-fiber bidirectional optical transmission system of still another aspect of the present invention, planes of polarization of the first signal light and the second Raman pump light are orthogonal when a frequency relationship satisfies $|f_{s1}-f_0|=|f_{p2}-f_0|$, and planes of polarization of the second signal light and the first Raman pump light are orthogonal when a frequency relationship satisfies $|f_{s2}-f_0|=|f_{p1}-f_0|$, where, $f_0$ is a zero dispersion frequency of the optical fiber transmission line, $f_{s1}$ and $f_{s2}$ are the frequencies of the first signal and the second signal, respectively, and $f_{p1}$ and $f_{p2}$ are frequencies of the first Raman pump light and the second Raman pump light, respectively. As a result, there is the effect that the one-fiber bidirectional optical transmission system having desired reception characteristics without being affected by four wave mixing bidirectionally can be realized.

According to the one-fiber bidirectional optical transmission system of still another aspect of the present invention, even when the first signal light and the second signal light are frequency-multiplexed signal lights of different wavelengths, respectively, planes of polarization of the first frequency-multiplexed signal lights and the second Raman pump light are orthogonal when the frequency relationship satisfies $|f_{s1\_i}-f_0|=|f_{p2}-f_0|$, and planes of polarization of the second frequency-multiplexed signal lights and the first Raman pump light are orthogonal when the frequency relationship satisfies $|f_{s2\_j}-f_0|=|f_{p1}-f_0|$, where, $f_0$ is a zero dispersion frequency of the optical fiber transmission line, $f_{s1\_i}$ (i=1, 2, ..., m) and $f_{s2\_j}$ (j=1, 2, ..., n) are the frequencies of the first frequency-multiplexed signal lights and the second frequency-multiplexed signal lights, respectively, and $f_{p1}$ and $f_{p2}$ are the frequencies of the first Raman pump light and the second Raman pump light, respectively. As a result, there is the effect that the one-fiber bidirectional optical transmission system having desired reception characteristics without being affected by four wave mixing bidirectionally can be realized.

According to the one-fiber bidirectional optical transmission system of still another aspect of the present invention, even when the first Raman pump light and the second Raman pump light are respectively Raman pump lights of different frequencies, when the first signal light and the second signal light are respectively one, planes of polarization of the first signal light and the second Raman pump lights are orthogonal when the frequency relationship satisfies $|f_{s1}-f_0|=|f_{p2\_h}-f_0|$, and planes of polarization of the second signal light and the first Raman pump lights are orthogonal when the frequency relationship satisfies $|f_{s2}-f_0|=|f_{p1\_k}-f_0|$, where $f_0$ is a zero dispersion frequency of the optical fiber transmission line, $f_{s1}$ and $f_{s2}$ are the frequencies of the first signal and the second signal, respectively, and $f_{p1\_k}$ (k=1, 2, ..., r) and $f_{p2\_h}$ (h=1, 2, ..., s) are the frequencies of the first frequency-multiplexed Raman pump lights and the second frequency-multiplexed Raman pump lights, respectively; and when the first signal light and the second signal light are respectively multiplexed signal lights, planes of polarization of the first frequency-multiplexed signal lights and the second Raman pump lights are orthogonal when the frequency relationship satisfies $|f_{s1\_i}-f_0|=|f_{p2\_h}-f_0|$, and planes of polarization of the second frequency-multiplexed signal lights and the first Raman pump lights are orthogonal when the frequency relationship satisfies $|f_{s2\_j}-f_0|=|f_{p1\_k}-f_0|$, where $f_0$ is a zero dispersion frequency of the optical fiber transmission line, $f_{s1\_i}$ (I=1, 2, ..., m) and $f_{s2\_j}$ (j=1, 2, ..., n) are the frequencies of the first frequency-multiplexed signal lights and the second frequency-multiplexed signal lights, respectively, and $f_{p1\_k}$ (k=1, 2, ..., r) and $f_{p2\_h}$ (h=1, 2, ..., s) are the frequencies of the first frequency-multiplexed Raman pump lights and the second frequency-multiplexed Raman pump lights, respectively. As a result, a large capacity one-fiber bidirectional optical transmission system having desired reception characteristics without being affected by four wave mixing bidirectionally can be realized, the number of frequency multiplication can be increased, and a wider Raman gain band than that of a single-frequency Raman pump light can be obtained.

According to the one-fiber bidirectional optical transmission system of still another aspect of the present invention, the one-fiber bidirectional optical transmission system includes the first operation transmission lines that are portions of the optical fiber transmission line near the one input-output terminal and the other input-output terminal, respectively, and a second optical fiber transmission line that is a portion of the optical fiber transmission line between the two first optical fiber transmission lines, and by selecting $f_{s1}$, $f_{s2}$, $f_{p1\_k}$, $f_{p2\_h}$, and $f_{1\_1\text{-}0}$ so that the conditional inequality of $|f_{s1}-f_{1\_0}|\neq|f_{p2}-f_{1\_0}|$ and $|f_{s2}-f_{1\_0}|\neq|f_{p1}-f_{1\_0}|$ is realized, where, $f_{1\_0}$ is a zero dispersion frequency of the first optical fiber transmission line, $f_{s1}$ and $f_{s2}$ are the frequencies of the first signal and the second signal, respectively, and $f_{p1}$ and $f_{p2}$ are the frequencies of the first Raman pump light and the second Raman pump light, respectively, a large capacity one-fiber bidirectional optical transmission system having desired reception characteristics without being affected by four wave mixing bidirectionally can be realized. Further, in a section of the second optical fiber transmission line where the Raman pump light power is weak, and it is not necessary to worry about the influence of four wave mixing, the degree of freedom in selecting an optical fiber having small wavelength dispersion or having a small transmission loss increases.

According to the one-fiber bidirectional optical transmission system of still another aspect of the present invention, by selecting $f_{s1\_i}$, $f_{s2\_j}$, $f_{p1}$, $f_{p2}$, and $f_0$ so that the conditional inequality of $|f_{s1\_i}-f_{1\_0}|\neq|f_{p2}-f_{1\_0}|$ (i=1, 2, . . . , m) and $|f_{s2\_j}-f_{1\_0}|\neq|f_{p1}-f_{1\_0}|$ (j=1, 2, . . . , n) is realized, where, $f_{s1\_i}$ and $f_{s2\_j}$ are respective frequencies of the first signal lights and the second signal lights, respectively, $f_{1\_0}$ is a zero dispersion frequency of the first optical fiber transmission line, and $f_{p1}$ and $f_{p2}$ are the frequencies of the first Raman pump light and the second Raman pump light, respectively, a one-fiber bidirectional optical transmission system having desired reception characteristics without being affected by four wave mixing bidirectionally can be realized. Further, in the section of the second optical fiber transmission line where the Raman pump light power is weak, and it is not necessary to worry about the influence of four wave mixing, the degree of freedom in selecting an optical fiber having small wavelength dispersion or having a small transmission loss increases.

According to the one-fiber bidirectional optical transmission system of still another aspect of the present invention, each of the first Raman pump light and the second Raman pump light is a plurality of Raman pump lights of different wavelengths, and the respective wavelengths of the first Raman pump lights and the second Raman pump lights are different from each other. By selecting $f_{s1}$, $f_{s2}$, $f_{p1\_k}$, $f_{p2\_h}$, and $f_{1\_0}$ so that the conditional inequality of $|f_{s1}-f_{1\_0}|\neq|f_{p2\_h}-f_{1\_0}|$ and $|f_{s2}-f_{1\_0}|\neq|f_{p1\_k}-f_{1\_0}|$ is realized, where, $f_{s1}$ and $f_{s2}$ are the frequencies of the first signal lights and the second signal lights, respectively, $f_{1\_0}$ is a zero dispersion frequency of the first optical fiber transmission line, and $f_{p1\_k}$ (k=1, 2, . . . , r) and $f_{p2\_h}$ (h=1, 2, . . . , s) are respective frequencies of the first frequency-multiplexed Raman pump lights and the second frequency-multiplexed Raman pump lights, respectively, a large capacity one-fiber bidirectional optical transmission system having desired reception characteristics without being affected by four wave mixing bidirectionally can be realized, the number of frequency multiplication can be increased, and a wider Raman gain band than that of a single-frequency Raman pump light can be obtained. Further, in the section of the second optical fiber transmission line where the Raman pump light power is weak, and it is not necessary to worry about the influence of four wave mixing, the degree of freedom in selecting an optical fiber having small wavelength dispersion or having a small transmission loss increases.

According to the one-fiber bidirectional optical transmission system of still another aspect of the present invention, since a 1.3 micrometer zero dispersion single mode fiber is used for the first optical fiber transmission line, a one-fiber bidirectional optical transmission system having desired reception characteristics without being affected by four wave mixing bidirectionally can be realized, and in the section of the second optical fiber transmission line where the Raman pump light power is weak, and it is not necessary to worry about the influence of four wave mixing, the degree of freedom in selecting an optical fiber having a small transmission loss increases.

According to the one-fiber bidirectional optical transmission system of still another aspect of the present invention, by using a dispersion shifted fiber for the first optical fiber transmission line, a one-fiber bidirectional optical transmission system having desired reception characteristics without being affected by four wave mixing bidirectionally can be realized in a section of the first optical fiber transmission line where the Raman pump light power is strong, and in the section of the second optical fiber transmission line where the Raman pump light power is weak, and it is not necessary to worry about the influence of four wave mixing, the degree of freedom in selecting an optical fiber having small wavelength dispersion increases.

According to the one-fiber bidirectional optical transmission system of still another aspect of the present invention, since the one-fiber bidirectional optical transmission system is a non-relay transmission system, the one-fiber bidirectional optical transmission system that is not affected by four wave mixing bidirectionally and has excellent cost effectiveness can be realized.

According to the one-fiber bidirectional optical transmission system of still another aspect of the present invention, since the one-fiber bidirectional optical transmission system is a relay transmission system, the one-fiber bidirectional optical transmission system that is not affected by four wave mixing bidirectionally and has high transmission quality can be realized.

INDUSTRIAL APPLICABILITY

As explained above, the one-fiber bidirectional optical transmission system according to the present invention is suitable for a field of long distance optical communication, in which further extension between relays and reduction in the communication cost are required.

What is claimed is:

1. A one-fiber bidirectional optical transmission system, comprising:
    an optical fiber transmission line that transmits a first signal light and a second signal light, wherein the first signal light is transmitted in a first direction from one input-output terminal to other input-output terminal, and the second signal light is transmitted in a second direction that is opposite to the first direction;
    a first Raman pump source that generates a first Raman pump light, wherein a Raman gain band of the first Raman pump light includes a frequency of the first signal light but does not include a frequency of the second signal light;
    a first injection unit that injects the first Raman pump light into the optical fiber transmission line from the other input-output terminal;
    a second Raman pump source that generates a second Raman pump light, wherein a Raman gain band of the second Raman pump light includes a frequency of the second signal light but does not include a frequency of the first signal light; and
    a second injection unit that injects the second Raman pump light into the optical fiber transmission line from the one input-output terminal, wherein a frequency relationship satisfies a following inequality, $$|f_{s1}-f_0| \neq |f_{p2}-f_0| \text{ and } |f_{s2}-f_0| \neq |f_{p1}-f_0|,$$

where $f_0$ is a zero dispersion frequency of the optical fiber transmission line, $f_{s1}$ and $f_{s2}$ are the frequencies of the first signal light and the second signal light, respectively, and $f_{p1}$ and $f_{p2}$ are frequencies of the first Raman pump light and the second Raman pump light, respectively.

2. The one-fiber bidirectional optical transmission system according to claim 1, wherein
  each of the first and second signal lights is a frequency-multiplexed signal light of a plurality of different wavelengths.

3. The one-fiber bidirectional optical transmission system according to claim 1, wherein
  each of the first and second Raman pump lights is a plurality of Raman pump lights of different wavelengths.

4. The one-fiber bidirectional optical transmission system according to claim 1, wherein
  each of the first and second signal lights is a frequency-multiplexed signal light of a plurality of different wavelengths, and
  each of the first and second Raman pump lights is a plurality of Raman pump lights of different wavelengths.

5. The one-fiber bidirectional optical transmission system according to claim 1, wherein
  the optical fiber transmission line is a non-zero dispersion shifted fiber with a zero dispersion wavelength at 1500 nm waveband when wavebands of the first signal light and the second signal light are 1550 nm and 1580 nm, respectively.

6. The one-fiber bidirectional optical transmission system according to claim 1, wherein
  the one-fiber bidirectional optical transmission system is a non-relay transmission system.

7. The one-fiber bidirectional optical transmission system according to claim 1, wherein
  the one-fiber bidirectional optical transmission system is a relay transmission system.

8. A one-fiber bidirectional optical transmission system, comprising:
  an optical fiber transmission line that transmits a first signal light and a second signal light, wherein the first signal light is transmitted in a first direction from one input-output terminal to other input-output terminal, and the second signal light is transmitted in a second direction that is opposite to the first direction;
  a first Raman pump source that generates a Raman pump light, wherein a Raman gain band of the Raman pump light includes a frequency of the first signal light but does not include a frequency of the second signal light;
  a first injection unit that injects the first Raman pump light into the optical fiber transmission line from the other input-output terminal;
  a second Raman pump source that generates a Raman pump light, wherein a Raman gain band of the Raman pump light includes a frequency of the second signal light but does not include a frequency of the first signal light; and
  a second injection unit that injects the second Raman pump light into the optical fiber transmission line from the one input-output terminal, wherein
  planes of polarization of the first signal light and the second Raman pump light are orthogonal when a frequency relationship satisfies a following equation $$|f_{s1}-f_0|=|f_{p2}-f_0|,$$

and planes of polarization of the second signal light and the first Raman pump light are orthogonal when a frequency relationship satisfies a following equation $$|f_{s2}-f_0|=|f_{p1}-f_0|,$$

where $f_0$ is a zero dispersion frequency of the optical fiber transmission line, $f_{s1}$ and $f_{s2}$ are the frequencies of the first signal light and the second signal light, respectively, and $f_{p1}$ and $f_{p2}$ are frequencies of the first Raman pump light and the second Raman pump light, respectively.

9. The one-fiber bidirectional optical transmission system according to claim 8, wherein
  each of the first and second signal lights is a frequency-multiplexed signal light of a plurality of different wavelengths, respectively.

10. The one-fiber bidirectional optical transmission system according to claim 8, wherein
  each of the first and second Raman pump lights is a plurality of Raman pump lights of different wavelengths.

11. The one-fiber bidirectional optical transmission system according to claim 8, wherein
  each of the first and second signal lights is a frequency-multiplexed signal light of a plurality of different wavelengths, and
  each of the first and second Raman pump lights is a plurality of Raman pump lights of different wavelengths.

12. A one-fiber bidirectional optical transmission system, comprising:
  an optical fiber transmission line that transmits a first signal light and a second signal light, wherein the first signal light is transmitted in a first direction from one input-output terminal to other input-output terminal, and the second signal light is transmitted in a second direction that is opposite to the first direction;
  a first Raman pump source that generates a Raman pump light, wherein a Raman gain band of the Raman pump light includes a frequency of the first signal light but does not include a frequency of the second signal light;
  a first injection unit that injects the first Raman pump light into the optical fiber transmission line from the other input-output terminal;
  a second Raman pump source that generates a Raman pump light, wherein a Raman gain band of the Raman pump light includes a frequency of the second signal light but does not include a frequency of the first signal light; and
  a second injection unit that injects the second Raman pump light into the optical fiber transmission line from the one input-output terminal, wherein
  the optical fiber transmission line includes first optical fiber transmission lines that are portions of the optical fiber transmission line near the one input-output terminal and the other input-output terminal, respectively, and a second optical fiber transmission line that is a portion of the optical fiber transmission line between the two first optical fiber transmission lines, and
  a frequency relationship satisfies a following inequality, $$|f_{s1}-f_{1\_0}| \neq |f_{p2}-f_{1\_0}| \text{ and } |f_{s2}-f_{1\_0}| \neq |f_{p1}-f_{1\_0}|,$$

where $f_{1\_0}$ is a zero dispersion frequency of the optical fiber transmission line, $f_{s1}$ and $f_{s2}$ are the frequencies of the first signal light and the second signal light, respectively, and $f_{p1}$ and $f_{p2}$ are frequencies of the first Raman pump light and the second Raman pump light, respectively.

13. The one-fiber bidirectional optical transmission system according to claim 12, wherein
   each of the first and second signal lights is a frequency-multiplexed signal light of a plurality of different wavelengths.

14. The one-fiber bidirectional optical transmission system according to claim 12, wherein
   each of the first and second Raman pump lights is a plurality of Raman pump lights of different wavelengths.

15. The one-fiber bidirectional optical transmission system according to claim 12, wherein
   each of the first and second signal lights is a frequency-multiplexed signal light of a plurality of different wavelengths, and
   each of the first and second Raman pump lights is a plurality of Raman pump lights of different wavelengths.

16. The one-fiber bidirectional optical transmission system according to claim 12, wherein
   the first optical fiber transmission line is a 1.3-micrometer zero-dispersion single-mode fiber.

17. The one-fiber bidirectional optical transmission system according to claim 12, wherein
   the first optical fiber transmission line is a dispersion shifted fiber.

* * * * *